United States Patent
Humphrey et al.

(10) Patent No.: US 6,684,202 B1
(45) Date of Patent: Jan. 27, 2004

(54) COMPUTER-BASED SYSTEM AND METHOD FOR FINDING RULES OF LAW IN TEXT

(75) Inventors: Timothy L. Humphrey, Kettering, OH (US); X. Allan Lu, Springboro, OH (US); James S. Wiltshire, Jr., Springboro, OH (US); John T. Morelock, Beavercreek, OH (US); Spiro G. Collias, Springboro, OH (US); Salahuddin Ahmed, San Diego, CA (US)

(73) Assignee: Lexis Nexis, Miamisburg, OH (US)

( * ) Notice: Subject to any disclaimer, the term of this patent is extended or adjusted under 35 U.S.C. 154(b) by 771 days.

(21) Appl. No.: 09/583,867

(22) Filed: May 31, 2000

(51) Int. Cl.[7] .................................................. G06N 5/04
(52) U.S. Cl. ................................. 706/45; 707/2; 707/5
(58) Field of Search ............................... 706/45; 704/1, 704/9; 707/2, 5

(56) References Cited

U.S. PATENT DOCUMENTS

| | | | | |
|---|---|---|---|---|
| 5,146,405 A | * | 9/1992 | Church | 704/9 |
| 5,182,708 A | * | 1/1993 | Ejiri | 704/1 |
| 6,006,221 A | * | 12/1999 | Liddy et al. | 707/5 |
| 6,397,205 B1 | * | 5/2002 | Juola | 707/2 |
| 6,415,248 B1 | * | 7/2002 | Bangalore et al. | 704/1 |
| 6,470,307 B1 | * | 10/2002 | Turney | 704/9 |
| 6,529,902 B1 | * | 3/2003 | Kanevsky et al. | 707/5 |
| 6,535,849 B1 | * | 3/2003 | Pakhomov et al. | 704/235 |

* cited by examiner

Primary Examiner—Wilbert L. Starks, Jr.
(74) Attorney, Agent, or Firm—Jacobson Holman PLLC

(57) ABSTRACT

A system and method for binary classification of text units such as sentences, paragraphs and documents as either a rule of law (ROL) or not a rule of law (~ROL).

During a training phase of the system and method of the present invention, an initialized knowledge base and labeled or pre-classified sentences are used to build a trained knowledge base. The trained knowledge base contains an equation, a threshold, and a plurality of statistical values called Z values.

When inputting text documents for classification, a Z value is generated for each term or token in the input text. The Z values are input to the equation which calculates a score for each sentence. Each calculated score is then compared to the threshold to classify each sentence as either ROL or ~ROL.

19 Claims, 7 Drawing Sheets

FIG. 1 Exemplary Hardware Configuration

COMPUTER-BASED SYSTEM AND METHOD FOR FINDING RULES OF LAW IN TEXT

BACKGROUND OF THE INVENTION

1. Field of the Invention

The present invention is related to the field of binary classification and, more particularly, to a computer-automated system and method for the binary classification of text units constituting rules of law in case law documents.

2. Description of the Related Art

When disagreements arise about the proper interpretation of statutes, administrative regulations, and constitutions, the higher courts of our land clarify their meaning by applying established judicial criteria. A written description of this application is known as the court's opinion. In order to understand a particular statute or provision of the Constitution, one has to see how the courts have interpreted it, i.e., one needs to read the courts' opinions.

Every case law opinion describes the nature of the dispute and the basis for the court's decision. Courts apply the basic methods of legal reasoning that are taught in all law schools and are used in the practice of law. Most case law documents begin with an introduction that sets forth the facts and procedural history of the case. The court then identifies the issues in dispute, followed by a statement of the prevailing law pertaining to the issue, the court's decision on the issue, and the court's rationale for its decision. Finally there is a statement of the court's overall disposition which either affirms or reverses the judgment of the lower court.

In order to apply the case as precedent, one must determine the significance of the court's decision for future litigants as well as identify the general principles of law that are likely to be applied in future cases. The holding is a statement that the law is to be interpreted in a certain way when a given set of facts exists.

Most written court opinions devote considerable space to justifying the court's decisions. In the rationale, the court usually follows established patterns of legal reasoning and reviews the relevant provisions of the constitutions, statutes, and case law and then relates the thought processes used to arrive at the court's judgment.

A 'rule of law' is a general statement of the law and its application under a given set of circumstances that is intended to guide conduct and may be applied to subsequent situations having analogous circumstances. Rules of law are found in the rationales used by the court to support their decisions and often the holding is considered a rule of law.

In the prior art, ascertaining the rule or rules of law in any given decision required an individual to manually read through the text of court decisions. This is time consuming and requires the reviewing individual to read a lot of superfluous material in the effort to glean what are often just a few, pithy rules of law. Therefore, a need exists for a way to automate document review while still accurately identifying the rules of law.

Distinguishing a rule of law from text that does not constitute a rule of law requires binary classification. In the prior art, there are many statistical and machine learning approaches to binary classification. Examples of statistical approaches include Bayes' rule, k-nearest neighbor, projection pursuit regression, discriminant analysis, and regression analysis. Examples of machine learning approaches include Naive Bayes, neural networks, and regression trees.

These approaches can be grouped into two broad classes based on the type of classification being done. When a set of observations is given with the aim of establishing the existence of classes or clusters in the data, this is known as unsupervised learning or clustering. When it is known for certain that there are N classes, and the aim is to establish a rule whereby new observations can be classified into one of the existing classes, then this is known as supervised learning. With supervised learning, a rule for classifying new observations is established using known, correctly classified data.

Rules can be established using many of the supervised techniques mentioned above. One such technique is logistic regression, a statistical regression procedure that may be used to establish an equation for classifying new observations.

In general, regression analysis is the analysis of the relationship between one variable and another set of variables. The relationship is expressed as an equation. Using the equation it is possible to predict a response, or dependent, variable from a function of regressor variables and parameters. Regressor variables are sometimes referred to as independent variables, predictors, explanatory variables, factors, features, or carriers.

Standard regression analysis, or linear regression, is not recommended for the present invention because of the dichotomous nature of the response variable, which indicates that a unit of text is either a rule of law (ROL) or not a rule of law (~ROL). The reason this is true is because $R^2$, which is used by linear regression to evaluate the effectiveness of the regression, is not suitable when the response variable is dichotomous. The present invention uses logistic regression because it uses the maximum likelihood estimation procedure to evaluate the effectiveness of the regression and this procedure works with a response variable that is dichotomous.

The training process of logistic regression operates by choosing a hyperplane to separate the classes as well as possible, but the criterion for a good separation, or goodness of fit, is not the same as for other regression methods, such as linear regression. For logistic regression, the criterion for a good separation is the maximum of a conditional likelihood. Logistic regression is identical, in theory, to linear regression for normal distributions with equal covariances, and also for independent binary features. So, the greatest differences between the two are to be expected when the data depart from these two cases, for example when the features have very non-normal distributions with very dissimilar covariances.

Several well known statistical packages contain a procedure for logistic regression, e.g., the SAS package has a logistic procedure, and SPSS has one called LOGISTIC REGRESSION.

Binomial distributions may be compared using what is known as a Z value. In statistics the so-called binomial distribution describes the possible number of times that a particular event will occur in a sequence of observations. The event is coded binary, i.e., it may or may not occur. The binomial distribution is used when a researcher is interested in the occurrence of an event instead of, for example, its magnitude. For instance, in a clinical trial, a patient may survive or die. The researcher studies the number of survivors, and not how long the patient survives after treatment. Another example is whether a person is overweight. The binomial distribution describes the number of overweight persons, and not the extent to which they are overweight.

There are many practical problems involved in the comparison of two binomial parameters. For example, social scientists may wish to compare the proportions of women taking advantage of prenatal health services for two communities that represent different socioeconomic backgrounds. Or, a director of marketing may wish to compare the public awareness of a new product recently launched with that of a competitor's product.

Two binomial parameters can be compared using the Z statistic, where:

$$Z=(P0-P1)/(TP*(1-TP)(1/T0+1/T1))^{0.5}$$

where Px is the probability of binomial parameter x (where x is either binomial parameter 0 or 1); TP is the combined probability of the two binomial parameters; and Tx is the sample size taken from the population(s) in order to estimate the two probabilities P0 and P1.

The same formula can be used to compare a binomial parameter from two different distributions. In this case, Px is the probability of the binomial parameter in distribution x, where x is either distribution 0 or 1; TP is the probability of the binomial parameter regardless of the distribution from which it came; and Tx is the sample size taken from distribution x, where x is either distribution 0 or 1.

A word in text creates a binomial distribution, i.e., the word either is in the text or it is not. Therefore, the above formula can be used to compare a word that appears in two distributions.

Furthermore, the above formula indicates that words with large Z values (either large positive or large negative values) have a higher probability of being in one distribution over the other. This implies that Z values can be used to a) automatically suggest words for a query, i.e., term suggestion, in an information retrieval system like Smart, and b) calculate an effective feature for a binary classification system.

The T-test is a statistical test that has been used to select terms (words) that are suggestive of a particular topic (P) of a set of documents. The T-test can be used to compare a topic (P) set of documents with a set of documents (R) randomly selected from many different topics. The interval between the occurrences of words can be selected as the basis for statistical analysis. Underlying this test is the assumption that topical (P) single words should appear more frequently and more regularly, i.e., at approximately even intervals, in the topic (P) set of documents. Therefore, terms that had this property, i.e., that appeared more frequently and more regularly in the topic (P) set of documents than in the (R) set of documents, would be the ones most suggestive of the topic P.

The formula for the T statistic is:

$$T=n^{0.5}(X-X\text{bar})/s$$

Where n is the number of intervals of a particular word, W, in the topic (P) set of documents; X is the mean interval of the word W in the R set of documents; Xbar is the mean interval in the P set of documents; and s is variation or standard deviation of a word in the P set of documents.

The T-test method of finding words suggestive of a particular topic (P) uses the interval between the occurrences of words while the Z value method relies on the difference in the number of times a word appears in a set of topic related documents and a set of documents from many different topic areas.

SUMMARY OF THE INVENTION

This invention is a system and method for binary classification of text units such as sentences, paragraphs and documents. Because the classification is binary, a text unit is classified as one of two classes. The preferred embodiment is a system and method for the classification of text units as either a rule of law (ROL) or not a rule of law (~ROL).

During a training phase of the system and method of the present invention, an initialized knowledge base and a collection of labeled or pre-classified text units are used to build a trained knowledge base. The trained knowledge base contains an equation, a threshold, and a plurality of statistical values called Z values. This trained knowledge base is used to classify text units within the input text of any case law document as either ROL or ~ROL.

A Z value, which is the most effective tool in the classification process, is generated for each term or token in the input text, as hereinafter defined. The Z values are used to calculate the average Z value for each text unit. The average Z value, and possibly other features, is then input to the equation which calculates a score for each sentence. Each calculated score is then compared to the threshold to classify each text unit as either ROL or ~ROL.

The trained knowledge base is generated by inputting a training set of text units. In the training set, each text unit is already classified as either a ROL text unit or ~ROL text unit. The inputted training set is partitioned into two subsets on a random basis. The two subsets represent a regression set and calibration set. A Z value is generated for each term or token in the regression set. Then, these Z values are used to calculate the average Z value for each text unit of the regression set. Using these average Z values, and possibly other features, a linear equation is created for calculating the score for each text unit. The threshold against which each score is evaluated is selected using the generated Z values, the linear equation and the calibration set.

Using the trained knowledge base, the present invention further comprises a method of finding and marking ROL text units in an input case law document having text that has not been previously classified. Upon input of the case law document, a portion of the document is extracted. In the preferred embodiment, this portion is the court's majority opinion. The majority opinion is partitioned into text units, and features are generated for each text unit. Features are characteristics that are representative of text units in a particular class and are helpful in distinguishing ROL text units from ~ROL text units.

Applying the linear equation and a sigmoid function to each text unit, a score is generated for each text unit. The scores are compared to a threshold, and text units having scores greater than the threshold are selected and marked as ROL text units. The document may then be output with the ROL text units marked.

Accordingly, it is an object of the present invention to provide a computer-automated system and method for finding rules of law in case law documents.

Another object of the invention is a computer-automated system and method for calculating a feature known as the average Z value which can be used to distinguish text units from two general classes.

A further object of the invention is a computer-automated system and method for calculating features and tokens that are effective for distinguishing rule of law text units from other text units within a case law document.

A still further object of the invention is a computer-automated system and method for selecting terms that are suggestive of a particular topic.

It is yet another object of the invention to provide a computerized system and method that will enable portions of case law documents to be categorized in an automated manner.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
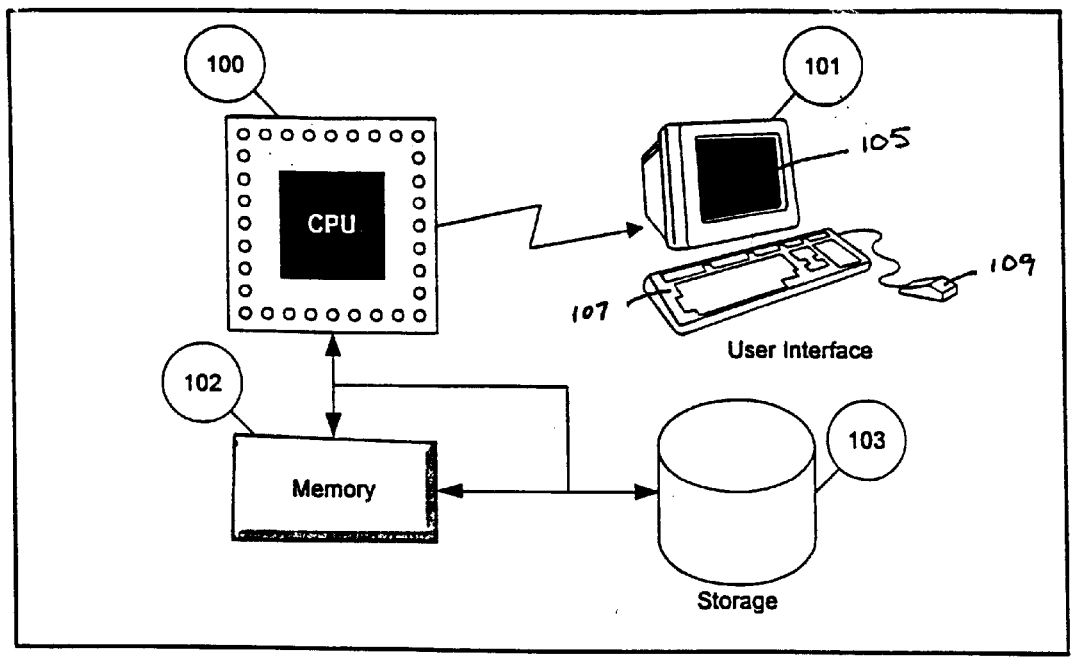
FIG. 1 illustrates an exemplary hardware configuration implementing the inventive system and method of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose. For example, in addition to being applied to the specific task of classifying text units of a case law document as either ROL or ~ROL, this invention can be applied to any binary classification task. Similarly, the reference in this specification to "sentence" may refer to any text unit that can be extracted/identified such as phrases, sentences, paragraphs, documents, etc. In addition, the Z values calculated for terms can be used to select terms that are suggestive of a particular topic P when this process is applied to sets of documents.

Definitions of Terminology

As used in this specification, the following terms have the following meanings:

Binary classification of text units—the task of classifying text units in one of two classes. For example, in the preferred embodiment, the two classes are rule of law (ROL) text units and not rule of law (~ROL) text units.

Feature—a characteristic of a text unit that can be expressed as a numeric value and therefore can be used in logistic regression.

Labeled text units—text units, such as sentences or paragraphs, that have associated with them a label or classification. In the preferred embodiment this label is either ROL (class=1) or ~ROL (class=0). See Table II for an example set of sentences.

ROL—Stands for 'rule of law' which is defined in accordance with accepted use of this term in the legal field. Generally, a rule of law is a general statement of the law and its application under particular circumstances that is intended to guide conduct and may be applied to subsequent legal situations having analogous circumstances. In the preferred embodiment ROL is class=1.

~ROL—Stands for 'not ROL'. This is one of two classifications for text units in the preferred embodiment. In the preferred embodiment ~ROL is class=0.

Term—a word or possibly a phrase.

Token—a name given to a group of terms or any string that matches a specified regular expression.

Z value of a term or token—$(P0-P1)/(TP*(1-TP)(1/T0+1/T1))^{0.5}$, where Px is the probability of term/token T given class x (where x is either 0 or 1); TP is the total probability of the term or token; and Tx is the number of terms/tokens in class x (where x is either 0 or 1).

Average Z for a text unit—the sum of Z values for all terms/tokens of a text unit divided by the number of terms/tokens in the text unit.

With these definitions established, the structure and operation of preferred embodiments of the invention are now described.

I. Exemplary Hardware Embodiment

As representatively shown in FIG. 1, the inventive ROL recognition system of the present invention may be implemented as a software system including a series of modules on a conventional computer. An exemplary hardware platform includes a central processing unit 100. The central processing unit 100 interacts with a human user through a user interface 101. The user interface is used for inputting information into the system and for interaction between the system and the human user. The user interface includes, for example, a video display 105, keyboard 107 and mouse 109. Memory 102 provides storage for data (such as legal case law documents, and a training set of labeled text units) and software programs (such as the ROL recognition process) that are executed by the central processing unit. Memory 102 may be random access memory. Auxiliary memory 103, such as a hard disk drive or a tape drive, provides additional storage capacity and a means for retrieving large batches of information.

All components shown in FIG. 1 may be of a type well known in the art. For example, the system may include a SUN workstation including the execution platform SPARC-system 10 and SUN OS Version 5.5.1, available from SUN MICROSYSTEMS of Sunnyvale, Calif. The software may be written in such programming languages as C, C++, and Perl. Of course, the system of the present invention may be implemented on any number of computer systems, both those existing and those that will be developed in the future.

Exemplary embodiments of the inventive methods provided by the invention are now described.

II. ROL Recognition System

Figure 2:
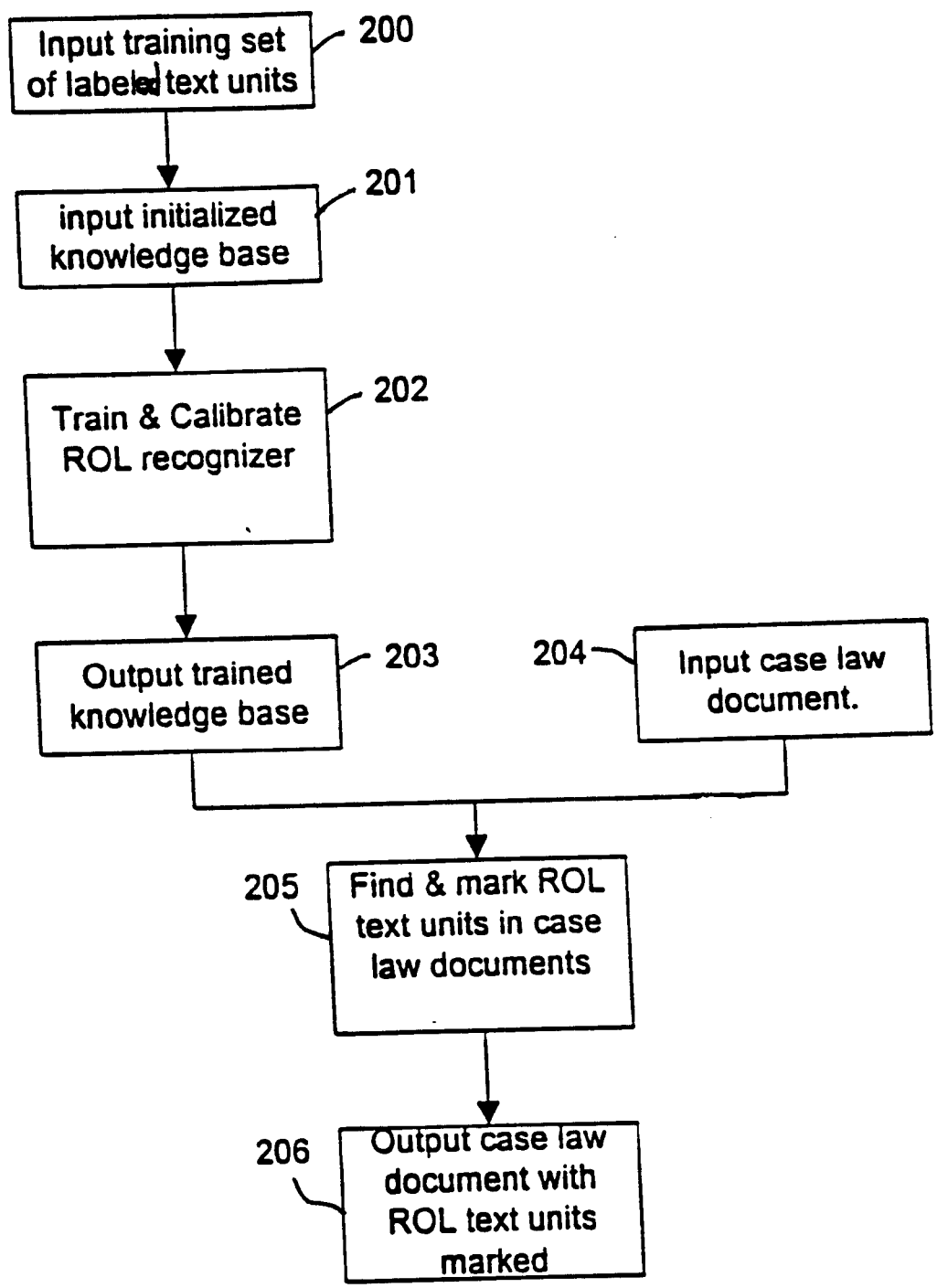
FIG. 2 is a high-level flowchart of a preferred implementation of the rule of law method of the present invention.

A high-level flow chart of the ROL recognition method is shown in FIG. 2. The method begins with input of the training set of labeled text units 200, and input of an initialized knowledge base 201. An example of an initialized knowledge base 201 follows:

maxsize=200
pasttenseverbs=1
presenttenseverbs=1
pronouns=1
firstnames=1
partynames=1
quotedstrings=1
case_citations=1
statute_citations=1 where 'maxsize=200' is an estimate of the size of the largest sentence, i.e., 200 terms. The other variable settings given above indicate various tokenizations that should be added by the sub-process, Get Terms & Tokens of each text unit, which will be discussed later in this document. A value of 1 means 'do the associated tokenization' while a value of 0 means 'do not do the associated tokenization'. For example, 'pronouns=1' indicates that the pronoun token, PRONOUN_TOK, should be created.

The ROL Recognition System shown in FIG. 2 includes two central sub-processes: the Train & Calibrate ROL recognizer sub-process 202, and the Find & Mark ROL text units in case law documents sub-process 205. In the Train & Calibrate sub-process, an initialized knowledge base and a training set of labeled sentences from a set of case law documents are input. The output of this sub-process is a trained knowledge base 203. The Find & Mark sub-process begins with input of a case law document 204 and uses the trained knowledge base to find and mark text units of the inputted case law document that are subsequently determined to be ROL text units.

More particularly, the Train & Calibrate ROL recognizer sub-process uses the inputted training set of labeled text units 200, and initialized knowledge base 201, to produce a trained knowledge base 203. Once the trained knowledge base is created, then the Find & Mark ROL text units in case law documents sub-process 205 uses the knowledge base to find and mark the ROL text units in the inputted case law documents.

The output of the Train & Calibrate ROL recognizer sub-process of this system is a trained knowledge base 203. The outputs of the Find & Mark ROL text units in case law documents sub-process 205 are the inputted case law documents but with the ROL text units marked 206. The ROL text unit maybe marked by surrounding the ROL text unit with the sgml tags <ROL> . . . </ROL>. The body portion of an example inputted document with its one ROL surrounded by the sgml tags is shown in Table I. Other forms of marking may also be employed.

TABLE I

OPINION: DECISION & ORDER
<MAJORITY_OPINION>
DECISION & ORDER

In an action to foreclose a mortgage, the plaintiff appeals (1) from an order of the Supreme Court, Nassau County (Winslow, J.), dated Jun. 10, 1998, which denied its motion, inter alia, to vacate an order of the same court dated Dec. 26, 1997, granting the motion of the defendants Thomas Parisi and Chong Parisi to dismiss the complaint insofar as asserted against them upon its default in opposing the motion, and (2), as limited by its brief, from so much of an order of the same court, dated Oct. 28, 1998, as, upon reargument, adhered to the prior determination. ORDERED that the appeal from the order dated Jun. 10, 1998, is dismissed, as that order was superseded by the order dated Oct. 28, 1998, made upon reargument; and it is further, ORDERED that the order dated Oct. 28, 1998, is affirmed insofar as appealed from; and it is further,ORDERED that the respondents are awarded one bill of costs. <ROL>A mortgage is merely security for a debt or other obligation and cannot exist independently of the debt or obligation (see, *Copp v Sands Point Marina*, 17 NY2d 291, 792, 270 N.Y.S. 2d 599, 217 N.E. 2d 654),</ROL> Here, the motion to dismiss the complaint was properly granted since the debt which the mortgage secured concededly was satisfied prior to the commencement of the action.

The appellant's remaining contentions are without merit. BRACKEN, J. P., SULLIVAN, GOLDSTEIN, and McGINITY, J J., concur.
</MAJORITY_OPINION>

III. Train & Calibrate ROL Recognizer

Figure 3:
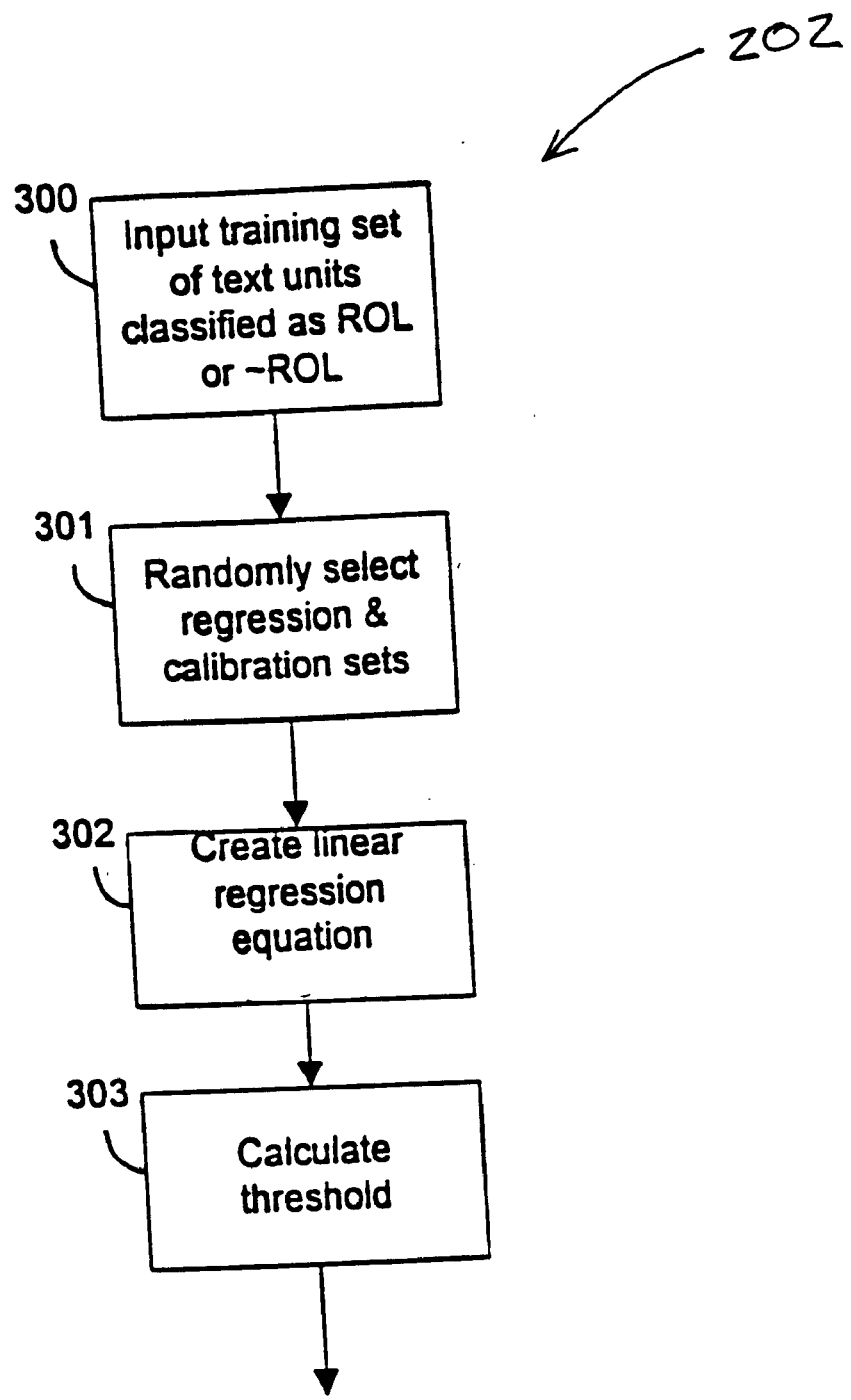
FIG. 3 is a flow diagram of the Train & Calibrate ROL recognizer step of FIG. 2.

The Train & Calibrate ROL recognizer sub-process 202 of FIG. 2 is set forth in greater detail in FIG. 3. This sub-process begins by inputting a training set of text units 300 that have already been correctly classified as ROL or ~ROL. An example of a training set is given in Table II.

TABLE II

| ID | C | Sentence |
|---|---|---|
| S01 | 0 | The agency denied his applications initially and on reconsideration. |
| S02 | 1 | In order for summary judgment to be granted, the pleadings, depositions, answers to interrogatories and admissions on file, together with the affidavits must show that there is no genuine issue of material fact and that the moving party is entitled to judgment as a matter of law. Fed. R. Civ. Pro. 56(c). |
| S03 | 1 | Federal Rule of Evidence 704(b) provides that no expert witness testifying with respect to the mental state or condition of a defendant in a criminal case may state an opinion or inference as to whether the defendant did or did not have the mental state or condition constituting an element of the crime charged or of a defense thereto. Such ultimate issues are matters for the trier of fact alone. |
| S04 | 0 | Prior to final agency action, the UMWA may petition this court to grant additional appropriate relief in the event MSHA fails to adhere substantially to a schedule that would, as described in Part III(C), constitute a good faith effort by MSHA to come into compliance with the Mine Act. See Monroe, 840 F.2d at 947; TRAC, 750 F.2d at 80–81; see also Zegeer, 768 F.2d at 1488 ("If MSHA should fail to act with appropriate diligence in following the estimates it has tendered to this court, petitioners may invoke our authority to direct MSHA to complete the rulemaking process with due dispatch."). |
| S05 | 1 | A defendant is entitled to the opportunity to present competent, relevant evidence on the issues being tried. See United States v. Hamling, 418 U.S. 87, 125, 41 L. Ed. 2d 590, 94 S. Ct. 2887 (1974). The district court, however, "retains considerable latitude even with admittedly relevant evidence in rejecting that which is cumulative . . . " Id. at 127. |
| S06 | 0 | While the Taxing Authorities may be ready to acknowledge the precedence of federal bankruptcy law over state taxing provisions, they argue that the bankruptcy court in its confirmation order interpreted 11 U.S.C. Section 1146 (c) too expansively, applying it to circumstances not covered by the Bankruptcy Code's exempting provision. |
| S07 | 0 | The contention that the omission of the Underwriters as judgment debtors was mere inadvertent clerical error is further rebutted by the fact that, at the time judgment was rendered, the Underwriters were not parties to the litigation and the trial court had no jurisdiction over them. |
| S08 | 1 | Causation may be established by obtaining a "judgment, consent decree or a settlement that 'change(s) the legal relations of the parties such that defendants are legally compelled to grant relief.'" Baumgartner v. Harrisburg Hous. Auth., 21 F.3d 541, 546 (3d Cir. 1994) (quoting Wheeler v. Towanda Area Sch. Dist., 950 F.2d 128, 132 (3d Cir. 1991)). Alternatively, plaintiff may establish causation through a "catalyst theory," where "even though the litigation did not result in a favorable judgment, the pressure of the lawsuit was a material contributing factor in bringing about extra judicial relief." |
| S09 | 0 | FOR THE COURT |

TABLE II-continued

| ID | C | Sentence |
|---|---|---|
| S10 | 1 | In essence, sufficiency is a test of adequacy. Whether the evidence is legally sufficient to sustain a verdict, is a question of law. |
| S11 | 0 | Moreover, even these after-the-fact statements reveal that McClaran believed that R/F was completely dismissed. |
| S12 | 1 | It is irrelevant in this matter that the deed to appellee's chain of title predated that to the appellants' chain of title. Appellants must have only "color of title." |
| S13 | 1 | n2 General Statutes Section 53a–60a provides in relevant part: "(a) A person is guilty of assault in the second degree with a firearm when he commits assault in the second degree as provided in section 53a–60, and in the commission of such offense he uses or is armed with and threatens the use of or displays or represents by his words or conduct that he possesses a pistol, revolver, machine gun, shotgun, rifle or other firearm. |
| S14 | 0 | That is the request you made, is that correct, Mr. Tittle? MR. TITTLE: It is, your Honor. |
| S15 | 1 | Wolcotts Fin. Serv., Inc. v. McReynolds, 807 S.W.2d 708, 710 (Tenn. Ct. App. 1990). The basis for the motion is that the allegations contained in the complaint, considered alone and taken as true, are insufficient to state a claim as a matter of law. Shelby County v. King, 620 S.W.2d 493, 494 (Tenn. 1981); Shipley v. Knoxville Journal Corp., 670 S.W.2d 222, 223 (Tenn. Ct. App. 1984). |
| S16 | 1 | The nature of the liabilities of an accommodation party is determined by the capacity in which he signed. Stockwell v. Bloomfield State Bank (1977), 174 Ind.App. 307, 367 N.E.2d 42. An accommodation maker's basic liability to a holder is identical to any other maker. |
| S17 | 0 | In Jensen the parties did not seriously contest the nature of the counterclaim. |
| S18 | 0 | Subject Matter Jurisdiction |
| S19 | 0 | At that time the pediatrician's office notified the Youngs and the Department of Health. |
| S20 | 1 | Norman v. Liberty Life Assurance Co., 556 S.W.2d 772, 773 (Tenn. App. 1977); Truan v. Smith, 578 S.W.2d 73, 74 (Tenn. 1979). Our duty upon review of conflicting evidence in a jury trial is not to determine where the truth lies, but only to determine if there was any material evidence to support the verdict below. |
| S21 | 0 | Penwell neither performed his affirmative duty under the policy to file a claim with Western and Southern for his total disability nor did he pay the premiums as they fell due, as required by the policy. |
| S22 | 0 | Kammes saw defendant holding a gun and standing in the center of the alley near a person who was lying face down. |
| S23 | 1 | n9 The administrative review appeals board is established under City of Waukesha, Wis., Municipal Code, Section 2.11(3) (1995). |
| S24 | 0 | Appellant asked to get his wallet. |
| S25 | 0 | Id. at 10–11. |
| S26 | 1 | n3 It is well established in workers' compensation law that when a work-related injury aggravates a pre-existing condition a compensable claim arises. |
| S27 | 1 | We have previously held that comprehensive general liability policies cover tortious acts but do not cover claims for breach of contract. |
| S28 | 1 | Specific jurisdiction refers to jurisdiction over causes of action arising from or related to a defendant's actions within the forum state," while "general jurisdiction . . . refers to the power of a state to adjudicate any cause of action involving a particular defendant, regardless of where the cause of action arose." |
| S29 | 1 | We have previously stated that under Section 1512 the government must prove that at least one of the law-enforcement-officer communications which the defendant sought to prevent would have been with a federal officer, but the government is not obligated to prove that the defendant knew or intended anything with respect to this federal involvement . . . The government may carry this burden by showing that the conduct which the defendant believed would be discussed in these communications constitutes a federal offense, so long as the government also presents additional appropriate evidence. |
| S30 | 0 | The United States as well as the State of Alabama was founded by people who believe in God. I believe this effort to return voluntary prayer to our public schools for its return to us to the original position of the writers of the Constitution, this local philosophies and beliefs hundreds of Alabamians have urged my continuous support for permitting school prayer. |

This example training set contains 30 sentences that have been randomly selected from a large population of sentences that have been classified as being a rule of law (C=1) or not a rule of law (C=0). Each sentence has an identifier (for reference only), and a classification (C) for class, where class=1 means the sentence is a ROL, and class=0 means the sentence is ~ROL. "Sentence" is the particular sentence of interest. This example training set is used here to illustrate the processing steps of this invention. When actually applying this invention, however, the sentences of the training set should be randomly selected from a large population of labeled sentences and the number selected should be large enough so that the training set is representative of the whole population.

The method of producing the trained knowledge base proceeds by randomly partitioning the inputted training set into two subsets, the regression subset and the calibration subset 301. Whichever subset is selected as the regression subset is used to create a regression equation 302, and the other unselected sentences, which constitute the calibration subset, are used to calculate a threshold 303.

More specifically, a random number generator is used to assign a random number between zero (0.0) and one (1.0) to each sentence of the training set. Then, these sentences are numerically sorted by their assigned random number. Finally, the first N% of the sorted sentences become the regression subset and the remaining sentences become the calibration subset. The value of N will vary depending on the size of the training set.

Table III is an example of a regression subset taken from the training set of Table II. Table III contains twenty sentences that have been randomly selected from the thirty sentences of Table II. These sentences are used to create Z values for each term or token found therein, as well as a logistic regression equation. As before in Table II, each sentence has an identifier (for reference only), and a classification (C) for class, where class=1 means the sentence is a ROL, and class=0 means the sentence is ~ROL. "Sentence" is the particular sentence of interest.

TABLE III

| ID | C | Sentences |
|---|---|---|
| S02 | 1 | In order for summary judgment to be granted, the pleadings, depositions, answers to interrogatories and admissions on file, together with the affidavits must show that there is no genuine issue of material fact and that the moving party is entitled to judgment as a matter of law. Fed. R. Civ. Pro. 56(c). |
| S03 | 1 | Federal Rule of Evidence 704(b) provides that no expert witness testifying with respect to the mental state or condition of a defendant in a criminal case may state an opinion or inference as to whether the defendant |

TABLE III-continued

| ID | C | Sentences |
|---|---|---|
|  |  | did or did not have the mental state or condition constituting an element of the crime charged or of a defense thereto. Such ultimate issues are matters for the trier of fact alone. |
| S04 | 0 | Prior to final agency action, the UMWA may petition this court to grant additional appropriate relief in the event MSHA fails to adhere substantially to a schedule that would, as described in Part III(C), constitute a good faith effort by MSHA to come into compliance with the Mine Act. See Monroe, 840 F.2d at 947; TRAC, 750 F.2d at 80–81; see also Zegeer, 768 F.2d at 1488 ("If MSHA should fail to act with appropriate diligence in following the estimates it has tendered to this court, petitioners may invoke our authority to direct MSHA to complete the rulemaking process with due dispatch."). |
| S05 | 1 | A defendant is entitled to the opportunity to present competent, relevant evidence on the issues being tried. See United States v. Hamling, 418 U.S. 87, 125, 41 L. Ed. 2d 590, 94 S. Ct. 2887 (1974). The district court, however, "retains considerable latitude even with admittedly relevant evidence in rejecting that which is cumulative . . . " Id. at 127. |
| S06 | 0 | While the Taxing Authorities may be ready to acknowledge the precedence of federal bankruptcy law over state taxing provisions, they argue that the bankruptcy court in its confirmation order interpreted 11 U.S.C. Section 1146 (c) too expansively, applying it to circumstances not covered by the Bankruptcy Code's exempting provision. |
| S08 | 1 | Causation may be established by obtaining a "judgment, consent decree or a settlement that 'change(s) the legal relations of the parties such that defendants are legally compelled to grant relief.'" Baumgartner v. Harrisburg Hous. Auth., 21 F.3d 541, 546 (3d Cir. 1994) (quoting Wheeler v. Towanda Area Sch. Dist., 950 F.2d 128, 132 (3d Cir. 1991)). Alternatively, plaintiff may establish causation through a "catalyst theory," where "even though the litigation did not result in a favorable judgment, the pressure of the lawsuit was a material contributing factor in bringing about extra judicial relief." |
| S10 | 1 | In essence, sufficiency is a test of adequacy. Whether the evidence is legally sufficient to sustain a verdict, is a question of law. |
| S11 | 0 | Moreover, even these after-the-fact statements reveal that McClaran believed that R/F was completely dismissed. |
| S12 | 1 | It is irrelevant in this matter that the deed to appellee's chain of title predated that to the appellants' chain of title. Appellants must have only "color of title." |
| S13 | 1 | n2 General Statutes Section 53a–60a provides in relevant part: "(a) A person is guilty of assault in the second degree with a firearm when he commits assault in the second degree as provided in section 53a–60, and in the commission of such offense he uses or is armed with and threatens the use of or displays or represents by his words or conduct that he possesses a pistol, revolver, machine gun, shotgun, rifle or other firearm. |
| S14 | 0 | That is the request you made, is that correct, Mr. Tittle? MR. TITTLE: It is, your Honor. |
| S18 | 0 | Subject Matter Jurisdiction |
| S19 | 0 | At that time the pediatrician's office notified the Youngs and the Department of Health. |
| S20 | 1 | Norman v. Liberty Life Assurance Co., 556 S.W.2d 772, 773 (Tenn.App. 1977); Truan v. Smith, 578 S.W.2d 73, 74 (Tenn. 1979). Our duty upon review of conflicting evidence in a jury trial is not to determine where the truth lies, but only to determine if there was any material evidence to support the verdict below. |
| S21 | 0 | Penwell neither performed his affirmative duty under the policy to file a claim with Western and Southern for his total disability nor did he pay the premiums as they fell due, as required by the policy. |
| S22 | 0 | Kammes saw defendant holding a gun and standing in the center of the alley near a person who was lying face down. |
| S23 | 1 | n9 The administrative review appeals board is established under City of Waukesha, Wis., Municipal Code, Section 2.11(3) (1995). |
| S24 | 0 | Appellant asked to get his wallet. |
| S26 | 1 | n3 It is well established in workers' compensation law that when a work-related injury aggravates a pre-existing condition a compensable claim arises. |
| S30 | 0 | The United States as well as the State of Alabama was founded by people who believe in God. I believe this effort to return voluntary prayer to our public schools for its return to us to the original position of the writers of the Constitution, this local philosophies and beliefs hundreds of Alabamians have urged my continuous support for permitting school prayer. |

Table IV is an example of a calibration subset taken from the same example training set of Table II. Table IV contains ten sentences from the thirty sentences of Table II. These sentences are used to establish a threshold for a logistic regression score resulting from the logistic equation which is used to decide if a sentence is or is not a rule of law. As before in Table II, each sentence has an identifier (for reference only), and a classification (C) for class, where class=1 means the sentence is a ROL, and class=0 means the sentence is ~ROL. "Sentence" is the particular sentence of interest.

TABLE IV

| ID | C | Sentences |
|---|---|---|
| S01 | 0 | The agency denied his applications initially and on reconsideration. |
| S07 | 0 | The contention that the omission of the Underwriters as judgment debtors was mere inadvertent clerical error is further rebutted by the fact that, at the time judgment was rendered, the Underwriters were not parties to the litigation and the trial court had no jurisdiction over them. |
| S09 | 0 | FOR THE COURT |
| S15 | 1 | Wolcotts Fin. Serv., Inc. v. McReynolds, 807 S.W.2d 708, 710 (Tenn. Ct. App. 1990). The basis for the motion is that the allegations contained in the complaint, considered alone and taken as true, are insufficient to state a claim as a matter of law. Shelby County v. King, 620 S.W.2d 493, 494 (Tenn. 1981); Shipley v. Knoxville Journal Corp., 670 S.W.2d 222, 223 (Tenn. Ct. App. 1984). |
| S16 | 1 | The nature of the liabilities of an accommodation party is determined by the capacity in which he signed. Stockwell v. Bloomfield State Bank (1977), 174 Ind.App. 307, 367 N.E.2d 42. An accommodation maker's basic liability to a holder is identical to any other maker. |
| S17 | 0 | In Jensen the parties did not seriously contest the nature of the counterclaim. |
| S25 | 0 | Id. at 10–11. |
| S27 | 1 | We have previously held that comprehensive general liability policies cover tortious acts but do not cover claims for breach of contract. |
| S28 | 1 | Specific jurisdiction refers to jurisdiction over causes of action arising from or related to a defendant's actions within the forum state," while "general jurisdiction . . . refers to the power of a state to adjudicate any cause of action involving a particular defendant, regardless of where the cause of action arose." |
| S29 | 1 | We have previously stated that under Section 1512 the government must prove that at least one of the law-enforcement-officer communications which the defendant sought to prevent would have been with a federal officer, but the government is not obligated to prove that the defendant knew or intended anything with respect to this federal involvement . . . The government may carry this |

TABLE IV-continued

| ID | C | Sentences |
|----|---|-----------|
|  |  | burden by showing that the conduct which the defendant believed would be discussed in these communications constitutes a federal offense, so long as the government also presents additional appropriate evidence. |

The above procedure, where the first N% of the sorted sentences become the regression subset and the remaining sentences become the calibration subset, was used to create these subsets where N is 66%, i.e., there are twenty sentences in the regression subset and ten in the calibration subset.

The method continues by creating a linear regression equation using the regression subset as input into the subprocess. Z values are generated for all terms and tokens in the text units of the regression subset. Logistic regression is used to develop an equation for scoring text units that might be ROL text units. The equation created by this step 302 for the example regression subset of Table III is equation= $0.7549-14.0622*f[1]-14.2148*f[2]-0.0560*f[3]+0.1234*f[4]$, where f[1] is the average Z value for the sentence, f[2] is the relative size of the sentence, f[3] is the number of terms or tokens in the sentence with negative Z values, and f[4] is the number of terms or tokens in the sentence. The set of Z values calculated for the same example regression subset is given in Table V.

Definition of the column headers of Table V is as follows. F0 is the number of times the term or token appears in a class=0 sentence; F1 is the number of times the term or token appears in a class=1 sentence; TP is the total probability of the term or token, i.e., (F0+F1)/(T0+T1); P0 is the probability of the term or token in class=0, i.e., F0/T0; P1 is the probability of the term or token class=1, i.e., F1/T1; Z is the Z value for the term or token, i.e., $(P0-P1)/(TP(1-TP)((1/T0)+(1/T1)))^{0.5}$; TERM/TOKEN is the term or found in some sentence of the training data.

TABLE V

| F0 | F1 | TP | P0 | P1 | Z | TERM/TOKEN |
|----|----|-----|-----|-----|------|------------|
| 0 | 1 | 0.00130 | 0.00000 | 0.00217 | -0.82189 | 11 |
| 0 | 1 | 0.00130 | 0.00000 | 0.00217 | -0.82189 | 56 |
| 0 | 1 | 0.00130 | 0.00000 | 0.00217 | -0.82189 | 60 |
| 0 | 1 | 0.00130 | 0.00000 | 0.00217 | -0.82189 | 60A |
| 0 | 1 | 0.00130 | 0.00000 | 0.00217 | -0.82189 | 704 |
| 0 | 1 | 0.00130 | 0.00000 | 0.00217 | -0.82189 | ABOUT |
| 1 | 0 | 0.00130 | 0.00322 | 0.00000 | 1.21829 | ACKNOWLEDGE |
| 1 | 0 | 0.00130 | 0.00322 | 0.00000 | 1.21829 | ACT |
| 1 | 0 | 0.00130 | 0.00322 | 0.00000 | 1.21829 | ACTION |
| 1 | 0 | 0.00130 | 0.00322 | 0.00000 | 1.21829 | ADDITIONAL |
| 0 | 1 | 0.00130 | 0.00000 | 0.00217 | -0.82189 | ADEQUACY |
| 1 | 0 | 0.00130 | 0.00322 | 0.00000 | 1.21829 | ADHERE |
| 0 | 1 | 0.00130 | 0.00000 | 0.00217 | -0.82189 | ADMINISTRATIVE |
| 0 | 1 | 0.00130 | 0.00000 | 0.00217 | -0.82189 | ADMISSIONS |
| 0 | 1 | 0.00130 | 0.00000 | 0.00217 | -0.82189 | ADMITTEDLY |
| 0 | 1 | 0.00130 | 0.00000 | 0.00217 | -0.82189 | AFFIDAVITS |
| 1 | 0 | 0.00130 | 0.00322 | 0.00000 | 1.21829 | AFFIRMATIVE |
| 1 | 0 | 0.00130 | 0.00322 | 0.00000 | 1.21829 | AFTER |
| 1 | 0 | 0.00130 | 0.00322 | 0.00000 | 1.21829 | AGENCY |
| 0 | 1 | 0.00130 | 0.00000 | 0.00217 | -0.82189 | AGGRAVATES |
| 1 | 0 | 0.00130 | 0.00322 | 0.00000 | 1.21829 | ALABAMA |
| 1 | 0 | 0.00130 | 0.00322 | 0.00000 | 1.21829 | ALABAMIANS |
| 1 | 0 | 0.00130 | 0.00322 | 0.00000 | 1.21829 | ALLEY |
| 0 | 1 | 0.00130 | 0.00000 | 0.00217 | -0.82189 | ALONE |
| 1 | 0 | 0.00130 | 0.00322 | 0.00000 | 1.21829 | ALSO |
| 0 | 1 | 0.00130 | 0.00000 | 0.00217 | -0.82189 | ALTERNATIVELY |
| 0 | 2 | 0.00259 | 0.00000 | 0.00434 | -1.16308 | AN |
| 4 | 4 | 0.01036 | 0.01286 | 0.00868 | 0.56317 | AND |
| 0 | 1 | 0.00130 | 0.00000 | 0.00217 | -0.82189 | ANSWERS |
| 0 | 1 | 0.00130 | 0.00000 | 0.00217 | -0.82189 | ANY |
| 0 | 1 | 0.00130 | 0.00000 | 0.00217 | -0.82189 | APPEALS |
| 1 | 0 | 0.00130 | 0.00322 | 0.00000 | 1.21829 | APPELLANT |
| 0 | 2 | 0.00259 | 0.00000 | 0.00434 | -1.16308 | APPELLANTS |
| 0 | 1 | 0.00130 | 0.00000 | 0.00217 | -0.82189 | APPELLEE |
| 1 | 0 | 0.00130 | 0.00322 | 0.00000 | 1.21829 | APPLYING |
| 1 | 0 | 0.00130 | 0.00322 | 0.00000 | 1.21829 | APPROPRIATE |
| 0 | 2 | 0.00259 | 0.00000 | 0.00434 | -1.16308 | ARE |
| 1 | 0 | 0.00130 | 0.00322 | 0.00000 | 1.21829 | ARGUE |
| 0 | 1 | 0.00130 | 0.00000 | 0.00217 | -0.82189 | ARISES |
| 0 | 1 | 0.00130 | 0.00000 | 0.00217 | -0.82189 | ARMED |
| 5 | 3 | 0.01036 | 0.01608 | 0.00651 | 1.28778 | AS |
| 1 | 0 | 0.00130 | 0.00322 | 0.00000 | 1.21829 | ASKED |
| 0 | 2 | 0.00259 | 0.00000 | 0.00434 | -1.16308 | ASSAULT |
| 1 | 0 | 0.00130 | 0.00322 | 0.00000 | 1.21829 | AT |
| 1 | 0 | 0.00130 | 0.00322 | 0.00000 | 1.21829 | AUTHORITIES |
| 3 | 0 | 0.00389 | 0.00965 | 0.00000 | 2.11289 | BANKRUPTCY |
| 1 | 2 | 0.00389 | 0.00322 | 0.00434 | -0.24597 | BE |
| 0 | 1 | 0.00130 | 0.00000 | 0.00217 | -0.82189 | BEING |
| 1 | 0 | 0.00130 | 0.00322 | 0.00000 | 1.21829 | BELIEFS |
| 2 | 0 | 0.00259 | 0.00643 | 0.00000 | 1.72404 | BELIEVE |
| 1 | 0 | 0.00130 | 0.00322 | 0.00000 | 1.21829 | BELIEVED |
| 0 | 1 | 0.00130 | 0.00000 | 0.00217 | -0.82189 | BELOW |
| 0 | 1 | 0.00130 | 0.00000 | 0.00217 | -0.82189 | BOARD |
| 0 | 1 | 0.00130 | 0.00000 | 0.00217 | -0.82189 | BRINGING |
| 0 | 1 | 0.00130 | 0.00000 | 0.00217 | -0.82189 | BUT |
| 4 | 2 | 0.00777 | 0.01286 | 0.00434 | 1.32269 | BY |
| 0 | 1 | 0.00130 | 0.00000 | 0.00217 | -0.82189 | CASE |
| 4 | 6 | 0.01295 | 0.01286 | 0.01302 | -0.01849 | CASE_CITE_TOK |
| 0 | 1 | 0.00130 | 0.00000 | 0.00217 | -0.82189 | CATALYST |
| 0 | 2 | 0.00259 | 0.00000 | 0.00434 | -1.16308 | CAUSATION |
| 1 | 0 | 0.00130 | 0.00322 | 0.00000 | 1.21829 | CENTER |
| 0 | 2 | 0.00259 | 0.00000 | 0.00434 | -1.16308 | CHAIN |
| 0 | 1 | 0.00130 | 0.00000 | 0.00217 | -0.82189 | CHANGE |
| 0 | 1 | 0.00130 | 0.00000 | 0.00217 | -0.82189 | CHARGED |
| 1 | 0 | 0.00130 | 0.00322 | 0.00000 | 1.21829 | CIRCUMSTANCES |
| 1 | 0 | 0.00130 | 0.00322 | 0.00000 | 1.21829 | CITY |
| 0 | 1 | 0.00130 | 0.00000 | 0.00217 | -0.82189 | CIV |
| 1 | 1 | 0.00259 | 0.00322 | 0.00217 | 0.28048 | CLAIM |
| 1 | 1 | 0.00259 | 0.00322 | 0.00217 | 0.28048 | CODE |
| 0 | 1 | 0.00130 | 0.00000 | 0.00217 | -0.82189 | COLOR |
| 1 | 0 | 0.00130 | 0.00322 | 0.00000 | 1.21829 | COME |
| 0 | 1 | 0.00130 | 0.00000 | 0.00217 | -0.82189 | COMMISSION |
| 0 | 1 | 0.00130 | 0.00000 | 0.00217 | -0.82189 | COMMITS |
| 0 | 1 | 0.00130 | 0.00000 | 0.00217 | -0.82189 | COMPELLED |
| 0 | 1 | 0.00130 | 0.00000 | 0.00217 | -0.82189 | COMPENSABLE |
| 0 | 1 | 0.00130 | 0.00000 | 0.00217 | -0.82189 | COMPENSATION |
| 0 | 1 | 0.00130 | 0.00000 | 0.00217 | -0.82189 | COMPETENT |
| 1 | 0 | 0.00130 | 0.00322 | 0.00000 | 1.21829 | COMPLETELY |
| 1 | 0 | 0.00130 | 0.00322 | 0.00000 | 1.21829 | COMPLIANCE |
| 0 | 3 | 0.00389 | 0.00000 | 0.00651 | -1.42540 | CONDITION |
| 0 | 1 | 0.00130 | 0.00000 | 0.00217 | -0.82189 | CONDUCT |
| 1 | 0 | 0.00130 | 0.00322 | 0.00000 | 1.21829 | CONFIRMATION |
| 0 | 1 | 0.00130 | 0.00000 | 0.00217 | -0.82189 | CONFLICTING |
| 0 | 1 | 0.00130 | 0.00000 | 0.00217 | -0.82189 | CONSENT |
| 0 | 1 | 0.00130 | 0.00000 | 0.00217 | -0.82189 | CONSIDERABLE |
| 1 | 0 | 0.00130 | 0.00322 | 0.00000 | 1.21829 | CONSTITUTE |
| 0 | 1 | 0.00130 | 0.00000 | 0.00217 | -0.82189 | CONSTITUTING |
| 1 | 0 | 0.00130 | 0.00322 | 0.00000 | 1.21829 | CONSTITUTION |
| 1 | 0 | 0.00130 | 0.00322 | 0.00000 | 1.21829 | CONTINUOUS |
| 0 | 1 | 0.00130 | 0.00000 | 0.00217 | -0.82189 | CONTRIBUTING |
| 1 | 0 | 0.00130 | 0.00322 | 0.00000 | 1.21829 | CORRECT |
| 2 | 1 | 0.00389 | 0.00643 | 0.00217 | 0.93346 | COURT |
| 1 | 0 | 0.00130 | 0.00322 | 0.00000 | 1.21829 | COVERED |
| 0 | 1 | 0.00130 | 0.00000 | 0.00217 | -0.82189 | CRIME |
| 0 | 1 | 0.00130 | 0.00000 | 0.00217 | -0.82189 | CRIMINAL |
| 0 | 1 | 0.00130 | 0.00000 | 0.00217 | -0.82189 | CUMULATIVE |
| 0 | 1 | 0.00130 | 0.00000 | 0.00217 | -0.82189 | DECREE |
| 0 | 1 | 0.00130 | 0.00000 | 0.00217 | -0.82189 | DEED |
| 1 | 3 | 0.00518 | 0.00322 | 0.00651 | -0.62490 | DEFENDANT |
| 0 | 1 | 0.00130 | 0.00000 | 0.00217 | -0.82189 | DEFENDANTS |
| 0 | 1 | 0.00130 | 0.00000 | 0.00217 | -0.82189 | DEFENSE |
| 0 | 2 | 0.00259 | 0.00000 | 0.00434 | -1.16308 | DEGREE |
| 1 | 0 | 0.00130 | 0.00322 | 0.00000 | 1.21829 | DEPARTMENT |
| 0 | 1 | 0.00130 | 0.00000 | 0.00217 | -0.82189 | DEPOSITIONS |

TABLE V-continued

| F0 | F1 | TP | P0 | P1 | Z | TERM/TOKEN |
|---|---|---|---|---|---|---|
| 1 | 0 | 0.00130 | 0.00322 | 0.00000 | 1.21829 | DESCRIBED |
| 0 | 2 | 0.00259 | 0.00000 | 0.00434 | -1.16308 | DETERMINE |
| 1 | 3 | 0.00518 | 0.00322 | 0.00651 | -0.62490 | DID |
| 1 | 0 | 0.00130 | 0.00322 | 0.00000 | 1.21829 | DISABILITY |
| 1 | 0 | 0.00130 | 0.00322 | 0.00000 | 1.21829 | DISMISSED |
| 0 | 1 | 0.00130 | 0.00000 | 0.00217 | -0.82189 | DISPLAYS |
| 0 | 1 | 0.00130 | 0.00000 | 0.00217 | -0.82189 | DISTRICT |
| 1 | 0 | 0.00130 | 0.00322 | 0.00000 | 1.21829 | DOWN |
| 1 | 0 | 0.00130 | 0.00322 | 0.00000 | 1.21829 | DUE |
| 1 | 1 | 0.00259 | 0.00322 | 0.00217 | 0.28048 | DUTY |
| 2 | 0 | 0.00259 | 0.00643 | 0.00000 | 1.72404 | EFFORT |
| 0 | 1 | 0.00130 | 0.00000 | 0.00217 | -0.82189 | ELEMENT |
| 0 | 2 | 0.00259 | 0.00000 | 0.00434 | -1.16308 | ENTITLED |
| 0 | 1 | 0.00130 | 0.00000 | 0.00217 | -0.82189 | ESSENCE |
| 0 | 1 | 0.00130 | 0.00000 | 0.00217 | -0.82189 | ESTABLISH |
| 0 | 3 | 0.00389 | 0.00000 | 0.00651 | -1.42540 | ESTABLISHED |
| 1 | 2 | 0.00389 | 0.00322 | 0.00434 | -0.24597 | EVEN |
| 1 | 0 | 0.00130 | 0.00322 | 0.00000 | 1.21829 | EVENT |
| 0 | 6 | 0.00777 | 0.00000 | 0.01302 | -2.01976 | EVIDENCE |
| 1 | 0 | 0.00130 | 0.00322 | 0.00000 | 1.21829 | EXEMPTING |
| 0 | 1 | 0.00130 | 0.00000 | 0.00217 | -0.82189 | EXISTING |
| 1 | 0 | 0.00130 | 0.00322 | 0.00000 | 1.21829 | EXPANSIVELY |
| 0 | 1 | 0.00130 | 0.00000 | 0.00217 | -0.82189 | EXPERT |
| 0 | 1 | 0.00130 | 0.00000 | 0.00217 | -0.82189 | EXTRAJUDICIAL |
| 1 | 0 | 0.00130 | 0.00322 | 0.00000 | 1.21829 | FACE |
| 1 | 2 | 0.00389 | 0.00322 | 0.00434 | -0.24597 | FACT |
| 0 | 1 | 0.00130 | 0.00000 | 0.00217 | -0.82189 | FACTOR |
| 1 | 0 | 0.00130 | 0.00322 | 0.00000 | 1.21829 | FAILS |
| 1 | 0 | 0.00130 | 0.00322 | 0.00000 | 1.21829 | FAITH |
| 0 | 1 | 0.00130 | 0.00000 | 0.00217 | -0.82189 | FAVORABLE |
| 0 | 1 | 0.00130 | 0.00000 | 0.00217 | -0.82189 | FED |
| 1 | 1 | 0.00259 | 0.00322 | 0.00217 | 0.28048 | FEDERAL |
| 1 | 0 | 0.00130 | 0.00322 | 0.00000 | 1.21829 | FELL |
| 1 | 1 | 0.00259 | 0.00322 | 0.00217 | 0.28048 | FILE |
| 1 | 0 | 0.00130 | 0.00322 | 0.00000 | 1.21829 | FINAL |
| 0 | 2 | 0.00259 | 0.00000 | 0.00434 | -1.16308 | FIREARM |
| 2 | 1 | 0.00389 | 0.00643 | 0.00217 | 0.93346 | FIRST_NAME_TOK |
| 3 | 2 | 0.00648 | 0.00965 | 0.00434 | 0.90174 | FOR |
| 1 | 0 | 0.00130 | 0.00322 | 0.00000 | 1.21829 | FOUNDED |
| 0 | 1 | 0.00130 | 0.00000 | 0.00217 | -0.82189 | GENERAL |
| 0 | 1 | 0.00130 | 0.00000 | 0.00217 | -0.82189 | GENUINE |
| 1 | 0 | 0.00130 | 0.00322 | 0.00000 | 1.21829 | GET |
| 1 | 0 | 0.00130 | 0.00322 | 0.00000 | 1.21829 | GOD |
| 1 | 0 | 0.00130 | 0.00322 | 0.00000 | 1.21829 | GOOD |
| 1 | 1 | 0.00259 | 0.00322 | 0.00217 | 0.28048 | GRANT |
| 0 | 1 | 0.00130 | 0.00000 | 0.00217 | -0.82189 | GRANTED |
| 0 | 1 | 0.00130 | 0.00000 | 0.00217 | -0.82189 | GUILTY |
| 1 | 1 | 0.00259 | 0.00322 | 0.00217 | 0.28048 | GUN |
| 1 | 2 | 0.00389 | 0.00322 | 0.00434 | -0.24597 | HAVE |
| 1 | 3 | 0.00518 | 0.00322 | 0.00651 | -0.62490 | HE |
| 1 | 0 | 0.00130 | 0.00322 | 0.00000 | 1.21829 | HEALTH |
| 3 | 1 | 0.00518 | 0.00965 | 0.00217 | 1.41926 | HIS |
| 1 | 0 | 0.00130 | 0.00322 | 0.00000 | 1.21829 | HOLDING |
| 1 | 0 | 0.00130 | 0.00322 | 0.00000 | 1.21829 | HONOR |
| 0 | 1 | 0.00130 | 0.00000 | 0.00217 | -0.82189 | HOWEVER |
| 1 | 0 | 0.00130 | 0.00322 | 0.00000 | 1.21829 | HUNDREDS |
| 0 | 1 | 0.00130 | 0.00000 | 0.00217 | -0.82189 | IF |
| 1 | 0 | 0.00130 | 0.00322 | 0.00000 | 1.21829 | III |
| 5 | 14 | 0.02461 | 0.01608 | 0.03037 | -1.25703 | IN |
| 0 | 1 | 0.00130 | 0.00000 | 0.00217 | -0.82189 | INFERENCE |
| 0 | 1 | 0.00130 | 0.00000 | 0.00217 | -0.82189 | INJURY |
| 1 | 0 | 0.00130 | 0.00322 | 0.00000 | 1.21829 | INTERPRETED |
| 0 | 1 | 0.00130 | 0.00000 | 0.00217 | -0.82189 | INTERROGATORIES |
| 1 | 0 | 0.00130 | 0.00322 | 0.00000 | 1.21829 | INTO |
| 0 | 1 | 0.00130 | 0.00000 | 0.00217 | -0.82189 | IRRELEVANT |
| 3 | 13 | 0.02073 | 0.00965 | 0.02820 | -1.77476 | IS |
| 0 | 1 | 0.00130 | 0.00000 | 0.00217 | -0.82189 | ISSUE |
| 0 | 2 | 0.00259 | 0.00000 | 0.00434 | -1.16308 | ISSUES |
| 2 | 2 | 0.00518 | 0.00643 | 0.00434 | 0.39718 | IT |
| 2 | 0 | 0.00259 | 0.00643 | 0.00000 | 1.72404 | ITS |
| 0 | 4 | 0.00518 | 0.00000 | 0.00868 | -1.64698 | JUDGMENT |
| 1 | 0 | 0.00130 | 0.00322 | 0.00000 | 1.21829 | JURISDICTION |
| 0 | 1 | 0.00130 | 0.00000 | 0.00217 | -0.82189 | JURY |
| 1 | 0 | 0.00130 | 0.00322 | 0.00000 | 1.21829 | KAMMES |
| 0 | 1 | 0.00130 | 0.00000 | 0.00217 | -0.82189 | LATITUDE |
| 1 | 3 | 0.00518 | 0.00322 | 0.00651 | -0.62490 | LAW |
| 0 | 1 | 0.00130 | 0.00000 | 0.00217 | -0.82189 | LAWSUIT |
| 0 | 1 | 0.00130 | 0.00000 | 0.00217 | -0.82189 | LEGAL |
| 0 | 2 | 0.00259 | 0.00000 | 0.00434 | -1.16308 | LEGALLY |
| 0 | 1 | 0.00130 | 0.00000 | 0.00217 | -0.82189 | LIES |
| 0 | 1 | 0.00130 | 0.00000 | 0.00217 | -0.82189 | LITIGATION |
| 1 | 0 | 0.00130 | 0.00322 | 0.00000 | 1.21829 | LOCAL |
| 1 | 0 | 0.00130 | 0.00322 | 0.00000 | 1.21829 | LYING |
| 0 | 1 | 0.00130 | 0.00000 | 0.00217 | -0.82189 | MACHINE |
| 1 | 0 | 0.00130 | 0.00322 | 0.00000 | 1.21829 | MADE |
| 0 | 3 | 0.00389 | 0.00000 | 0.00651 | -1.42540 | MATERIAL |
| 1 | 2 | 0.00389 | 0.00322 | 0.00434 | -0.24597 | MATTER |
| 0 | 1 | 0.00130 | 0.00000 | 0.00217 | -0.82189 | MATTERS |
| 2 | 3 | 0.00648 | 0.00643 | 0.00651 | -0.01303 | MAY |
| 1 | 0 | 0.00130 | 0.00322 | 0.00000 | 1.21829 | MCCLARAN |
| 0 | 2 | 0.00259 | 0.00000 | 0.00434 | -1.16308 | MENTAL |
| 1 | 0 | 0.00130 | 0.00322 | 0.00000 | 1.21829 | MINE |
| 1 | 0 | 0.00130 | 0.00322 | 0.00000 | 1.21829 | MOREOVER |
| 0 | 1 | 0.00130 | 0.00000 | 0.00217 | -0.82189 | MOVING |
| 2 | 0 | 0.00259 | 0.00643 | 0.00000 | 1.72404 | MR |
| 2 | 0 | 0.00259 | 0.00643 | 0.00000 | 1.72404 | MSHA |
| 0 | 1 | 0.00130 | 0.00000 | 0.00217 | -0.82189 | MUNICIPAL |
| 0 | 2 | 0.00259 | 0.00000 | 0.00434 | -1.16308 | MUST |
| 1 | 0 | 0.00130 | 0.00322 | 0.00000 | 1.21829 | MY |
| 0 | 1 | 0.00130 | 0.00000 | 0.00217 | -0.82189 | N2 |
| 0 | 1 | 0.00130 | 0.00000 | 0.00217 | -0.82189 | N3 |
| 0 | 1 | 0.00130 | 0.00000 | 0.00217 | -0.82189 | N9 |
| 1 | 0 | 0.00130 | 0.00322 | 0.00000 | 1.21829 | NEAR |
| 1 | 0 | 0.00130 | 0.00322 | 0.00000 | 1.21829 | NEITHER |
| 0 | 2 | 0.00259 | 0.00000 | 0.00434 | -1.16308 | NO |
| 1 | 0 | 0.00130 | 0.00322 | 0.00000 | 1.21829 | NOR |
| 1 | 3 | 0.00518 | 0.00322 | 0.00651 | -0.62490 | NOT |
| 1 | 0 | 0.00130 | 0.00322 | 0.00000 | 1.21829 | NOTIFIED |
| 0 | 1 | 0.00130 | 0.00000 | 0.00217 | -0.82189 | OBTAINING |
| 7 | 19 | 0.03368 | 0.02251 | 0.04121 | -1.41313 | OF |
| 0 | 1 | 0.00130 | 0.00000 | 0.00217 | -0.82189 | OFFENSE |
| 1 | 0 | 0.00130 | 0.00322 | 0.00000 | 1.21829 | OFFICE |
| 0 | 2 | 0.00259 | 0.00000 | 0.00434 | -1.16308 | ON |
| 0 | 2 | 0.00259 | 0.00000 | 0.00434 | -1.16308 | ONLY |
| 0 | 1 | 0.00130 | 0.00000 | 0.00217 | -0.82189 | OPINION |
| 0 | 1 | 0.00130 | 0.00000 | 0.00217 | -0.82189 | OPPORTUNITY |
| 0 | 11 | 0.01425 | 0.00000 | 0.02386 | -2.74374 | OR |
| 1 | 1 | 0.00259 | 0.00322 | 0.00217 | 0.28048 | ORDER |
| 1 | 0 | 0.00130 | 0.00322 | 0.00000 | 1.21829 | ORIGINAL |
| 0 | 1 | 0.00130 | 0.00000 | 0.00217 | -0.82189 | OTHER |
| 1 | 1 | 0.00259 | 0.00322 | 0.00217 | 0.28048 | OUR |
| 1 | 0 | 0.00130 | 0.00322 | 0.00000 | 1.21829 | OVER |
| 1 | 1 | 0.00259 | 0.00322 | 0.00217 | 0.28048 | PART |
| 0 | 1 | 0.00130 | 0.00000 | 0.00217 | -0.82189 | PARTIES |
| 0 | 1 | 0.00130 | 0.00000 | 0.00217 | -0.82189 | PARTY |
| 3 | 8 | 0.01425 | 0.00965 | 0.01735 | -0.88624 | PARTY_TOK |
| 1 | 0 | 0.00130 | 0.00322 | 0.00000 | 1.21829 | PAY |
| 1 | 0 | 0.00130 | 0.00322 | 0.00000 | 1.21829 | PEDIATRICIAN |
| 1 | 0 | 0.00130 | 0.00322 | 0.00000 | 1.21829 | PENWELL |
| 1 | 0 | 0.00130 | 0.00322 | 0.00000 | 1.21829 | PEOPLE |
| 1 | 0 | 0.00130 | 0.00322 | 0.00000 | 1.21829 | PERFORMED |
| 1 | 0 | 0.00130 | 0.00322 | 0.00000 | 1.21829 | PERMITTING |
| 1 | 1 | 0.00259 | 0.00322 | 0.00217 | 0.28048 | PERSON |
| 1 | 0 | 0.00130 | 0.00322 | 0.00000 | 1.21829 | PETITION |
| 1 | 0 | 0.00130 | 0.00322 | 0.00000 | 1.21829 | PHILOSOPHIES |
| 0 | 1 | 0.00130 | 0.00000 | 0.00217 | -0.82189 | PISTOL |
| 0 | 1 | 0.00130 | 0.00000 | 0.00217 | -0.82189 | PLAINTIFF |
| 0 | 1 | 0.00130 | 0.00000 | 0.00217 | -0.82189 | PLEADINGS |
| 2 | 0 | 0.00259 | 0.00643 | 0.00000 | 1.72404 | POLICY |
| 1 | 0 | 0.00130 | 0.00322 | 0.00000 | 1.21829 | POSITION |
| 0 | 1 | 0.00130 | 0.00000 | 0.00217 | -0.82189 | POSSESSES |
| 2 | 0 | 0.00259 | 0.00643 | 0.00000 | 1.72404 | PRAYER |
| 0 | 1 | 0.00130 | 0.00000 | 0.00217 | -0.82189 | PRE |
| 1 | 0 | 0.00130 | 0.00322 | 0.00000 | 1.21829 | PRECEDENCE |
| 0 | 1 | 0.00130 | 0.00000 | 0.00217 | -0.82189 | PREDATED |
| 1 | 0 | 0.00130 | 0.00322 | 0.00000 | 1.21829 | PREMIUMS |
| 0 | 1 | 0.00130 | 0.00000 | 0.00217 | -0.82189 | PRESENT |
| 22 | 29 | 0.06606 | 0.07074 | 0.06291 | 0.42974 | PRESENT_TENSE_VERB_TOK |
| 0 | 1 | 0.00130 | 0.00000 | 0.00217 | -0.82189 | PRESSURE |
| 1 | 0 | 0.00130 | 0.00322 | 0.00000 | 1.21829 | PRIOR |
| 0 | 1 | 0.00130 | 0.00000 | 0.00217 | -0.82189 | PRO |
| 14 | 6 | 0.02591 | 0.04502 | 0.01302 | 2.74522 | PRONOUN_TOK |
| 0 | 1 | 0.00130 | 0.00000 | 0.00217 | -0.82189 | PROVIDED |

TABLE V-continued

| F0 | F1 | TP | P0 | P1 | Z | TERM/TOKEN |
|---|---|---|---|---|---|---|
| 0 | 2 | 0.00259 | 0.00000 | 0.00434 | −1.16308 | PROVIDES |
| 1 | 0 | 0.00130 | 0.00322 | 0.00000 | 1.21829 | PROVISION |
| 1 | 0 | 0.00130 | 0.00322 | 0.00000 | 1.21829 | PROVISIONS |
| 1 | 0 | 0.00130 | 0.00322 | 0.00000 | 1.21829 | PUBLIC |
| 0 | 1 | 0.00130 | 0.00000 | 0.00217 | −0.82189 | QUESTION |
| 1 | 5 | 0.00777 | 0.00322 | 0.01085 | −1.18415 | QUOTED_STRING_LONG_TOK |
| 0 | 1 | 0.00130 | 0.00000 | 0.00217 | −0.82189 | QUOTING |
| 1 | 0 | 0.00130 | 0.00322 | 0.00000 | 1.21829 | READY |
| 0 | 1 | 0.00130 | 0.00000 | 0.00217 | −0.82189 | REJECTING |
| 0 | 1 | 0.00130 | 0.00000 | 0.00217 | −0.82189 | RELATED |
| 0 | 1 | 0.00130 | 0.00000 | 0.00217 | −0.82189 | RELATIONS |
| 0 | 3 | 0.00389 | 0.00000 | 0.00651 | −1.42540 | RELEVANT |
| 1 | 2 | 0.00389 | 0.00322 | 0.00434 | −0.24597 | RELIEF |
| 0 | 1 | 0.00130 | 0.00000 | 0.00217 | −0.82189 | REPRESENTS |
| 1 | 0 | 0.00130 | 0.00322 | 0.00000 | 1.21829 | REQUEST |
| 1 | 0 | 0.00130 | 0.00322 | 0.00000 | 1.21829 | REQUIRED |
| 0 | 1 | 0.00130 | 0.00000 | 0.00217 | −0.82189 | RESPECT |
| 0 | 1 | 0.00130 | 0.00000 | 0.00217 | −0.82189 | RESULT |
| 0 | 1 | 0.00130 | 0.00000 | 0.00217 | −0.82189 | RETAINS |
| 2 | 0 | 0.00259 | 0.00643 | 0.00000 | 1.72404 | RETURN |
| 1 | 0 | 0.00130 | 0.00322 | 0.00000 | 1.21829 | REVEAL |
| 0 | 2 | 0.00259 | 0.00000 | 0.00434 | −1.16308 | REVIEW |
| 0 | 1 | 0.00130 | 0.00000 | 0.00217 | −0.82189 | REVOLVER |
| 0 | 1 | 0.00130 | 0.00000 | 0.00217 | −0.82189 | RIFLE |
| 0 | 1 | 0.00130 | 0.00000 | 0.00217 | −0.82189 | RULE |
| 1 | 0 | 0.00130 | 0.00322 | 0.00000 | 1.21829 | SAW |
| 1 | 0 | 0.00130 | 0.00322 | 0.00000 | 1.21829 | SCHEDULE |
| 1 | 0 | 0.00130 | 0.00322 | 0.00000 | 1.21829 | SCHOOL |
| 1 | 0 | 0.00130 | 0.00322 | 0.00000 | 1.21829 | SCHOOLS |
| 0 | 2 | 0.00259 | 0.00000 | 0.00434 | −1.16308 | SECOND |
| 2 | 1 | 0.00389 | 0.00643 | 0.00217 | 0.93346 | SEE |
| 0 | 1 | 0.00130 | 0.00000 | 0.00217 | −0.82189 | SETTLEMENT |
| 0 | 1 | 0.00130 | 0.00000 | 0.00217 | −0.82189 | SHOTGUN |
| 0 | 1 | 0.00130 | 0.00000 | 0.00217 | −0.82189 | SHOW |
| 1 | 0 | 0.00130 | 0.00322 | 0.00000 | 1.21829 | SOUTHERN |
| 1 | 0 | 0.00130 | 0.00322 | 0.00000 | 1.21829 | STANDING |
| 2 | 3 | 0.00648 | 0.00643 | 0.00651 | −0.01303 | STATE |
| 1 | 0 | 0.00130 | 0.00322 | 0.00000 | 1.21829 | STATEMENTS |
| 1 | 0 | 0.00130 | 0.00322 | 0.00000 | 1.21829 | STATES |
| 0 | 1 | 0.00130 | 0.00000 | 0.00217 | −0.82189 | STATUTES |
| 0 | 3 | 0.00389 | 0.00000 | 0.00651 | −1.42540 | STAT_CITE_TOK |
| 1 | 0 | 0.00130 | 0.00322 | 0.00000 | 1.21829 | SUBJECT |
| 1 | 0 | 0.00130 | 0.00322 | 0.00000 | 1.21829 | SUBSTANTIALLY |
| 0 | 3 | 0.00389 | 0.00000 | 0.00651 | −1.42540 | SUCH |
| 0 | 1 | 0.00130 | 0.00000 | 0.00217 | −0.82189 | SUFFICIENCY |
| 0 | 1 | 0.00130 | 0.00000 | 0.00217 | −0.82189 | SUFFICIENT |
| 0 | 1 | 0.00130 | 0.00000 | 0.00217 | −0.82189 | SUMMARY |
| 1 | 1 | 0.00259 | 0.00322 | 0.00217 | 0.28048 | SUPPORT |
| 0 | 1 | 0.00130 | 0.00000 | 0.00217 | −0.82189 | SUSTAIN |
| 2 | 0 | 0.00259 | 0.00643 | 0.00000 | 1.72404 | TAXING |
| 0 | 1 | 0.00130 | 0.00000 | 0.00217 | −0.82189 | TEST |
| 0 | 1 | 0.00130 | 0.00000 | 0.00217 | −0.82189 | TESTIFYING |
| 7 | 10 | 0.02202 | 0.02251 | 0.02169 | 0.07578 | THAT |
| 22 | 26 | 0.06218 | 0.07074 | 0.05640 | 0.80930 | THE |
| 0 | 1 | 0.00130 | 0.00000 | 0.00217 | −0.82189 | THEORY |
| 0 | 2 | 0.00259 | 0.00000 | 0.00434 | −1.16308 | THERE |
| 0 | 1 | 0.00130 | 0.00000 | 0.00217 | −0.82189 | THERETO |
| 1 | 0 | 0.00130 | 0.00322 | 0.00000 | 1.21829 | THESE |
| 2 | 0 | 0.00259 | 0.00643 | 0.00000 | 1.72404 | THEY |
| 3 | 1 | 0.00518 | 0.00965 | 0.00217 | 1.41926 | THIS |
| 0 | 1 | 0.00130 | 0.00000 | 0.00217 | −0.82189 | THOUGH |
| 0 | 1 | 0.00130 | 0.00000 | 0.00217 | −0.82189 | THREATENS |
| 0 | 1 | 0.00130 | 0.00000 | 0.00217 | −0.82189 | THROUGH |
| 1 | 0 | 0.00130 | 0.00322 | 0.00000 | 1.21829 | TIME |
| 0 | 3 | 0.00389 | 0.00000 | 0.00651 | −1.42540 | TITLE |
| 2 | 0 | 0.00259 | 0.00643 | 0.00000 | 1.72404 | TITTLE |
| 13 | 14 | 0.03497 | 0.04180 | 0.03037 | 0.84800 | TO |
| 0 | 1 | 0.00130 | 0.00000 | 0.00217 | −0.82189 | TOGETHER |
| 1 | 0 | 0.00130 | 0.00322 | 0.00000 | 1.21829 | TOO |
| 1 | 0 | 0.00130 | 0.00322 | 0.00000 | 1.21829 | TOTAL |
| 0 | 1 | 0.00130 | 0.00000 | 0.00217 | −0.82189 | TRIAL |
| 0 | 1 | 0.00130 | 0.00000 | 0.00217 | −0.82189 | TRIED |
| 0 | 1 | 0.00130 | 0.00000 | 0.00217 | −0.82189 | TRIER |
| 0 | 1 | 0.00130 | 0.00000 | 0.00217 | −0.82189 | TRUTH |
| 0 | 1 | 0.00130 | 0.00000 | 0.00217 | −0.82189 | ULTIMATE |
| 1 | 0 | 0.00130 | 0.00322 | 0.00000 | 1.21829 | UMWA |
| 1 | 1 | 0.00259 | 0.00322 | 0.00217 | 0.28048 | UNDER |
| 1 | 0 | 0.00130 | 0.00322 | 0.00000 | 1.21829 | UNITED |
| 0 | 1 | 0.00130 | 0.00000 | 0.00217 | −0.82189 | UPON |
| 1 | 0 | 0.00130 | 0.00322 | 0.00000 | 1.21829 | URGED |
| 1 | 0 | 0.00130 | 0.00322 | 0.00000 | 1.21829 | US |
| 0 | 1 | 0.00130 | 0.00000 | 0.00217 | −0.82189 | USE |
| 0 | 1 | 0.00130 | 0.00000 | 0.00217 | −0.82189 | USES |
| 0 | 2 | 0.00259 | 0.00000 | 0.00434 | −1.16308 | VERDICT |
| 1 | 0 | 0.00130 | 0.00322 | 0.00000 | 1.21829 | VOLUNTARY |
| 1 | 0 | 0.00130 | 0.00322 | 0.00000 | 1.21829 | WALLET |
| 3 | 2 | 0.00648 | 0.00965 | 0.00434 | 0.90174 | WAS |
| 0 | 1 | 0.00130 | 0.00000 | 0.00217 | −0.82189 | WAUKESHA |
| 1 | 1 | 0.00259 | 0.00322 | 0.00217 | 0.28048 | WELL |
| 1 | 0 | 0.00130 | 0.00322 | 0.00000 | 1.21829 | WESTERN |
| 0 | 2 | 0.00259 | 0.00000 | 0.00434 | −1.16308 | WHEN |
| 0 | 2 | 0.00259 | 0.00000 | 0.00434 | −1.16308 | WHERE |
| 0 | 2 | 0.00259 | 0.00000 | 0.00434 | −1.16308 | WHETHER |
| 0 | 1 | 0.00130 | 0.00000 | 0.00217 | −0.82189 | WHICH |
| 1 | 0 | 0.00130 | 0.00322 | 0.00000 | 1.21829 | WHILE |
| 2 | 0 | 0.00259 | 0.00643 | 0.00000 | 1.72404 | WHO |
| 0 | 1 | 0.00130 | 0.00000 | 0.00217 | −0.82189 | WIS |
| 2 | 5 | 0.00907 | 0.00643 | 0.01085 | −0.63475 | WITH |
| 0 | 1 | 0.00130 | 0.00000 | 0.00217 | −0.82189 | WITNESS |
| 0 | 1 | 0.00130 | 0.00000 | 0.00217 | −0.82189 | WORDS |
| 0 | 1 | 0.00130 | 0.00000 | 0.00217 | −0.82189 | WORK |
| 0 | 1 | 0.00130 | 0.00000 | 0.00217 | −0.82189 | WORKERS |
| 1 | 0 | 0.00130 | 0.00322 | 0.00000 | 1.21829 | WOULD |
| 1 | 0 | 0.00130 | 0.00322 | 0.00000 | 1.21829 | WRITERS |
| 1 | 0 | 0.00130 | 0.00322 | 0.00000 | 1.21829 | YOU |
| 1 | 0 | 0.00130 | 0.00322 | 0.00000 | 1.21829 | YOUNGS |
| 1 | 0 | 0.00130 | 0.00322 | 0.00000 | 1.21829 | YOUR |

Using the Z values for every term or token found in the text of the regression subset, the equation developed in the previous step, and the calibration subset, a threshold is selected for the score calculated by the equation. The threshold selected for the inputted example training set is given above as part of the trained knowledge base and is 'threshold=0.5'. Frequently, the selected threshold will be a value close to 0.5.

Figure 4:
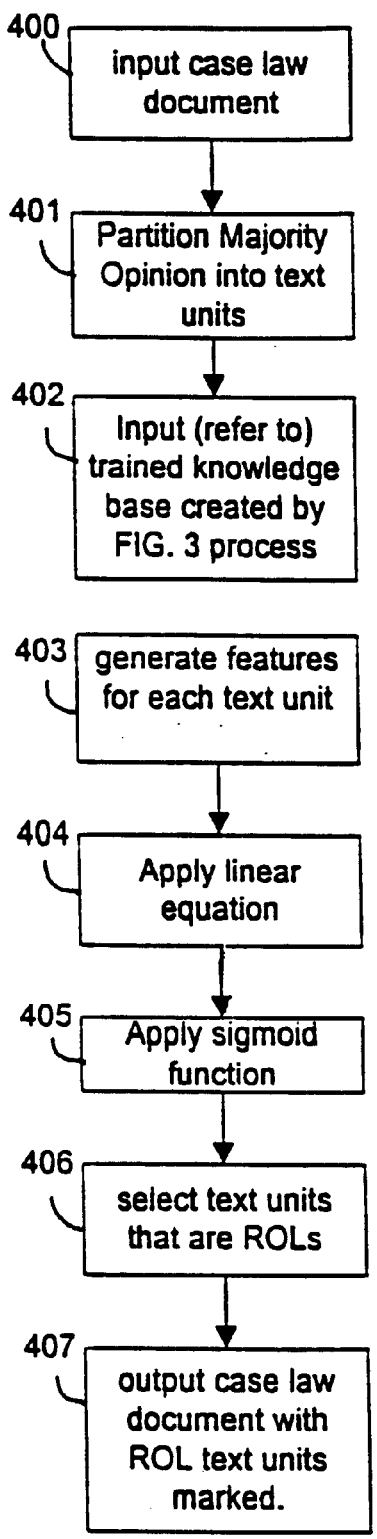
FIG. 4 is a flow diagram of a process for assigning a threshold value during development of the trained knowledge base, in accordance with the present invention.

With reference to FIG. 4, a more rigorous process for assigning a value to the threshold is to generate a score for each sentence of the calibration subset by carrying out a step 404 of applying a linear equation and carrying out a step 405 of applying a sigmoid function. These sentences are sorted and ranked in descending order of their scores, i.e., the largest scores are at the beginning of the sorted list. A score is then selected that best separates the sentences of the calibration subset into ROL (C=1) and ~ROL (C=0) groups. The more rigorous process shown in FIG. 4 is optional and is performed during development of the trained knowledge base.

Table VI shows the results of applying this process to the calibration subset of Table IV. Table VI shows the sentences, i.e. their sentence identifications (SIDs), ordered by their scores, with sentences having the largest scores listed first. Table VI also shows that any score between 0.1866 and 0.97.34 would perfectly separate the calibration subset into ROL and ~ROL groups. The value selected was 0.5 which is about half way between 0.1866 and 0.9734.

TABLE VI

| SID | C | SCORE |
|---|---|---|
| S27 | 1 | 0.9999 |
| S16 | 1 | 0.9993 |
| S29 | 1 | 0.9988 |

TABLE VI-continued

| SID | C | SCORE |
|-----|---|-------|
| S28 | 1 | 0.9977 |
| S15 | 1 | 0.9734 |
| S17 | 0 | 0.1866 |
| S07 | 0 | 0.0034 |
| S01 | 0 | 0.0000 |
| S09 | 0 | 0.0000 |
| S25 | 0 | 0.0000 |

Scores will not always perfectly separate the ROL sentences from the ~ROL sentences, that is, sometimes there will be ~ROL (C=0) sentences with larger scores than ROL (C=1) sentences. When there is not a perfect separation then the best threshold to select depends on how much and what type of error is desirable or tolerable.

Below is a representative listing of the contents of the trained knowledge base created by the ROL recognition system when the inputted training set is the example set given above and in Table II. p1 maxsize=200 pasttenseverbs=1
presenttenseverbs=1
pronouns=1
firstnames=1
partynames=1
quotedstrings=1
case_citations=1
statute_citations=1
equation=0.7549−14.0622*f[1]−14.2148*f[2]−0.560*f[3]+0.1234*f[4]
threshold=0.5
Z values for each term or token found in the regression set.

(Z values for exemplary training set are given in Table V.) where the equation and Z values were created by the step of creating a linear regression equation 302 of the Train & Calibrate ROL recognizer sub-process and the threshold was created by the step of this sub-process for calculating a threshold 303.

IV. Find & Mark ROL Text Units in Case Law Documents

Once the trained knowledge base has been developed, the Find & Mark ROL text units in the case law documents sub-process can find and mark ROL text units in the inputted case law documents. A selected portion of the inputted case law documents is most generally analyzed and, in the preferred embodiment, this selected portion is the court's Majority Opinion.

The Find & Mark ROL text units in case law documents sub-process 205 of FIG. 2 is shown in greater detail in FIG. 4. This sub-process begins with the step 400 of inputting a case law document. To describe this step, reference is made to the short exemplary case law document given in Table I which will be used as an exemplary excerpt of an inputted document. When a case is input to this sub-process it will not have ROL text units marked as shown in Table I. In the preferred embodiment, the Majority Opinion will be marked with sgml tags.

The next step 401 is to partition the Majority Opinion into text units. To partition the Majority Opinion, such opinion must first be found and extracted from the case law document. If the sections of the case have been marked using the sgml markup language, then it is easy to find and extract the Majority Opinion. For example, given that the Majority Opinion is enclosed in the following sgml tags:

<MAJORITY_OPINION> . . . </MAJORITY_OPINION>, then the following Perl regular expression extracts the Majority Opinion.

$opinion=$1 if /<MAJORITY_OPINION>(.+?)</MAJORITY_OPINION>/;

The Majority Opinion can be easily partitioned into sentences by assuming a sentence always ends with four lower case letters and a period. The present invention functions effectively even if the partitioning is not perfect.

Table VII shows the sentences resulting from partitioning the Majority Opinion of the exemplary input case of, Table I. For each sentence, Table VII provides: a) a sentence identification (SID); b) a classification, either ROL (C=1) or ~ROL (C=0); and c) the text of the sentence.

TABLE VII

| SID | C | Sentence |
|-----|---|----------|
| A01 | 0 | In an action to foreclose a mortgage, the plaintiff appeals (1) from an order of the Supreme Court, Nassau County (Winslow, J.), dated Jun. 10, 1998, which denied its motion, inter alia, to vacate an order of the same court dated Dec. 26, 1997, granting the motion of the defendants Thomas Parisi and Chong Parisi to dismiss the complaint insofar as asserted against them upon its default in opposing the motion, and (2), as limited by its brief, from so much of an order of the same court, dated Oct. 28, 1998, as, upon reargument, adhered to the prior determination. |
| A02 | 0 | ORDERED that the appeal from the order dated Jun. 10, 1998, is dismissed, as that order was superseded by the order dated Oct. 28, 1998, made upon reargument; and it is further, ORDERED that the order dated Oct. 28, 1998, is affirmed insofar as appealed from; and it is further, ORDERED that the respondents are awarded one bill of costs. |
| A03 | 1 | A mortgage is merely security for a debt or other obligation and cannot exist independently of the debt or obligation (see, <CaseCite>Copp v Sands Point Marina, 17 NY2d 291, 292, 270 N.Y.S.2d 599, 217 N.E.2d 654</CaseCite>). |
| A04 | 0 | Here, the motion to dismiss the complaint was properly granted since the debt which the mortgage secured concededly was satisfied prior to the commencement of the action. |
| A05 | 0 | The appellant's remaining contentions are without merit. |
| A06 | 0 | BRACKEN, J. P., SULLIVAN, GOLDSTEIN, and McGINITY, J J., concur. |

It is then necessary to carry out the step 402 of inputting, or referencing, a previously-input, trained knowledge base. An exemplary trained knowledge base follows:

maxsize=200
pasttenseverbs=1
presenttenseverbs=1
pronouns=1
firstnames=1
partynames=1
quotedstrings=1
case_citations=1
statute_citations=1
equation=0.7549−14.0622*f[1]−14.2148*f[2]−0.0560*f[3]+0.1234*f[4]
threshold=0.5
Z values for each term or token found in the regression set.

(Z values for exemplary training set are given in Table V.) where the equation and Z values were created by the step 302 of creating a linear regression equation and the threshold was created by the step 303 of calculating a threshold.

The next step 403 is to generate features for each text unit. This is accomplished by the sub-process 503 described in connection with FIG. 6. Table VIII enumerates the features of the sentences of the example case of Table I, as partitioned in Table. VII. The features are columns f[1] through f[4].

TABLE VIII

| SID | f[1] | f[2] | f[3] | f[4] | C | EResult | Score |
|-----|------|------|------|------|---|---------|-------|
| A01 | 0.3071 | 0.5100 | 25.0000 | 67.0000 | 0 | −3.9453 | 0.0190 |
| A02 | 0.2931 | 0.3000 | 11.0000 | 45.0000 | 0 | −2.6942 | 0.0633 |
| A03 | −0.3278 | 0.1050 | 6.0000 | 14.0000 | 1 | 5.2635 | 0.9948 |
| A04 | 0.3765 | 0.1350 | 5.0000 | 20.0000 | 0 | −4.2705 | 0.0138 |
| A05 | −0.0054 | 0.0400 | 2.0000 | 4.0000 | 0 | −11.0000 | 0.0000 |
| A06 | 0.4965 | 0.0450 | 0.0000 | 2.0000 | 0 | −11.0000 | 0.0000 |

As listed in Table VIII, SID is sentence identification, f[1] is the average Z value for the sentence, f[2] is the relative size of the sentence, f[3] is the number of terms or tokens in the sentence with negative Z values, f[4] is the number of terms or tokens in the sentence, C is the expected class of the sentence, EResult is the result of applying the linear equation; and Score is the result of applying the sigmoid function to EResult.

The next step 404 is to apply the linear equation created by the sub-process 202, Train & Calibrate ROL Recognizer. The linear equation created by the Train & Calibrate sub-process 202, using the regression set of Table III, is:

$$0.7549 - 14.0622 * f[1] - 14.2148 * f[2] - 0.0560 * f[3] + 0.1234 * f[4],$$

where the f[1], f[2], f[3], and f[4] are as described in Table VIII. Recall that this equation is part of the trained knowledge base output of step 203. Also, Table VIII gives the result of applying the linear equation to the sentences, i.e., column EResult.

As a single example, substituting into the above equation f[1] through f[4] for sentence A01 gives the following:

$$0.7549 - 14.0622 * 0.3071 - 14.2148 * 0.51 - 0.0560 * 25 + 0.1234 * 67 = -3.9453 \text{ (i.e., EResult)}$$

The next step 405 is to apply sigmoid function. The sigmoid function is $e^x/(1+e^x)$, where x is Eresult. Table VIII gives the result of applying the sigmoid function to sentences, i.e., column Score. For example, if x is the Eresult for sentence A01, (i.e., −3.9453), then $e^x$ is $e^{-3.9453}$ = 0.019345. So, the sigmoid function is $e^x/(1+e^x)$ = 0.019345/(1+0.019345) = 0.0190 (i.e., A01's Score).

The next step 406 is to select text units that are ROL text units. A text unit is selected as an ROL if its score is greater than the threshold found in the trained knowledge base that resulted from the training process (steps 200–203). For the training set of Table II, the threshold=0.5. Therefore, only sentence A03 of the sentences in Table VIII is an ROL. All other sentences have a score close to 0.0.

Finally, in step 407 the method outputs the case law document with ROL text units marked. As previously noted, ROL text units may be marked by enclosing them with the sgml tags: <ROL> . . . </ROL>, or by any other manner of marking as would be known to one of skill in the art.

V. Create Linear Regression Equation

Figure 5:
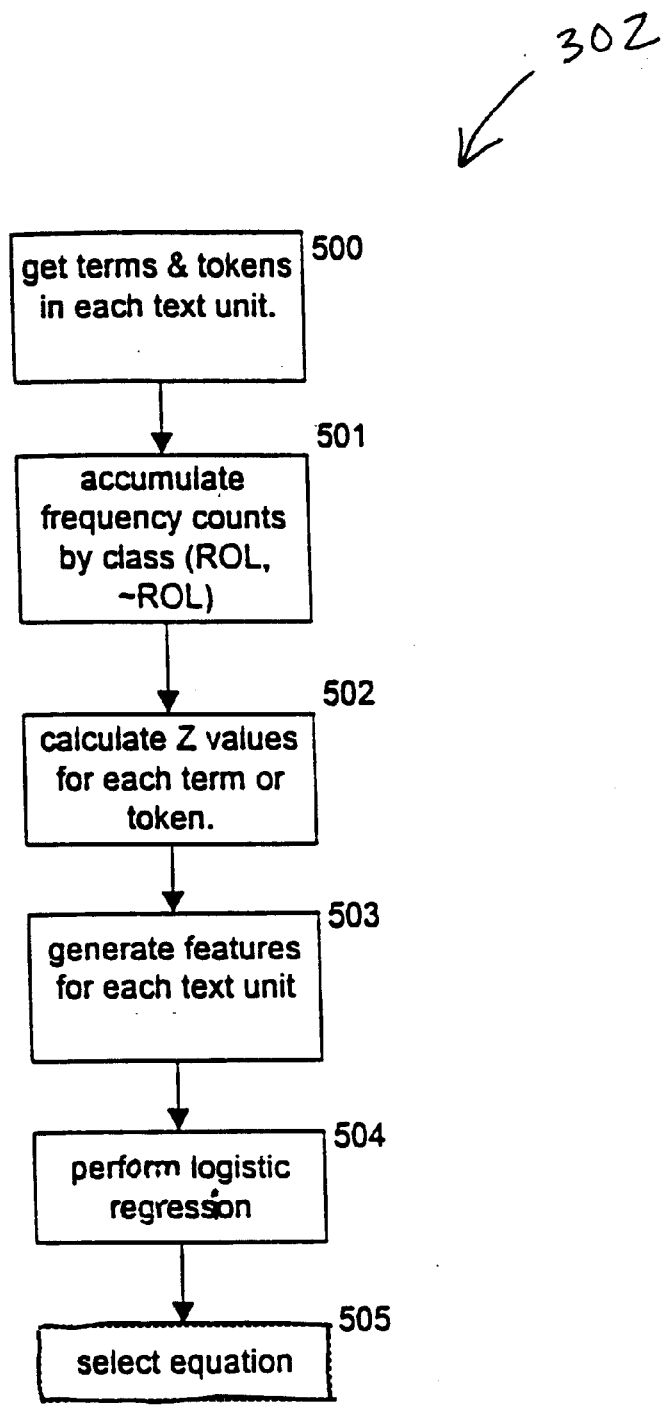
FIG. 5 is a flow diagram of the create linear regression equation step of FIG. 3.

FIG. 5 is an expansion of the create linear regression equation step 302 of FIG. 3. Input to the sub-process for creating a linear regression equation is the regression set of labeled sentences. Table III shows an example regression set of sentences.

The output of this sub-process is a trained knowledge base which contains: a) those things in the initialized knowledge base; b) a list of terms and tokens along with their associated Z values; c) an equation for determining if a sentence is a ROL or ~ROL; and d) a list of features selected from those provided.

The steps for creating the linear regression equation are set forth in FIG. 5. The method begins with the step 500 of getting terms or tokens for each text unit of the regression set. Table IX shows the terms and tokens resulting from this step for the regression set of Table III. The terms and tokens are in the right most column of Table IX. For each sentence of the exemplary regression set of Table III, as set forth in the second column from the right of Table IX, terms and tokens are provided.

TABLE IX

| | | | | | | | |
|---|---|---|---|---|---|---|---|
| SO 2 | −0.4419 | 0.265 | 35 | 53 | 1 | IN ORDER FOR SUMMARY JUDGMENT TO BE GRANTED, THE PLEADINGS, DEPOSITIONS, ANSWERS TO INTERROGATORIES AND ADMISSIONS ON FILE, TOGETHER WITH THE AFFIDAVITS MUST SHOW THAT THERE IS NO GENUINE ISSUE OF MATERIAL FACT AND THAT THE MOVING PARTY IS ENTITLED TO JUDGMENT AS A MATTER OF LAW. FED. R. CIV. PRO. 56 (C). | IN (−1.25703) , ORDER (0.28048), FOR (0.90174), SUMMARY (−0.82189), JUDGMENT (−1.64698), TO (0.84800), BE (−0.24597), GRANTED (−0.82189), THE (0.80930), PLEADINGS (−0.82189), DEPOSITIONS (−0.82189), ANSWERS (−0.82189), TO (0.84800), INTERROGATORIES (−0.82189), AND (0.56317), ADMISSIONS (−0.82189), ON (−1.16308), FILE (0.28048) TOGETHER (−0.82189), WITH (−0.63475), THE (0.80930), AFFIDAVITS (−0.82189), MUST (−1.16308), SHOW (−0.82189), THAT (0.07578), THERE (−1.16308), IS (−1.77476), NO (−1.16308), GENUINE (−0.82189), ISSUE (−0.82189), OF (−1.41313), MATERIAL (−1.42540), FACT (−0.24597), AND (0.56317), THAT (0.07578), THE (0.80930), MOVING (−0.82189), PARTY (−0.82189), IS (−1.77476), ENTITLED (−1.16308), TO (0.84800), JUDGMENT (−1.64698), AS (1.28778), MATTER (−0.24597), OF (−1.41313), LAW (−0.62490), FED (−0.82189), CIV (−0.82189), PRO (−0.82189), PRESENT_TENSE_VERB_TOK (0.42974), PRESENT_TENSE_VERB_TOK (0.42974), PRESENT_TENSE_VERB_TOK (0.42974), PRESENT_TENSE_VERB_TOK (0.42974) |

TABLE IX-continued

| | | | | | | | |
|---|---|---|---|---|---|---|---|
| SO 3 | −0.7172 | 0.355 | 57 | 71 | 1 | Federal Rule of Evidence 704 (b) provides that no expert witness testifying with respect to the mental state or condition of a defendant in a criminal case may state an opinion or inference as to whether the defendant did or did not have the mental state or condition constituting an element of the crime charged or of a defense thereto. Such ultimate issues are matters for the trier of fact alone. | FEDERAL (0.28048), RULE (−0.82189), OF (−1.41313), EVIDENCE (−2.01976), PROVIDES (−1.16308), THAT (0.07578), NO (−1.16308), EXPERT (−0.82189), WITNESS (−0.82189), TESTIFYING (−0.82189), WITH (−0.63475), RESPECT (−0.82189), TO (0.84800), THE (0.80930), MENTAL (−1.16308), STATE (−0.01303), OR (−2.74374), CONDITION (−1.42540), OF (−1.41313), DEFENDANT (−0.62490), IN (−1.25703), CRIMINAL (−0.82189), CASE (−0.82189), MAY (−0.01303), STATE (−0.01303), AN (−1.16308), OPINION (−0.82189), OR (−2.74374), INFERENCE (−0.82189), AS (1.28778), TO (0.84800), WHETHER (−1.16308), THE (0.80930), DEFENDANT (−0.62490), DID (−0.62490), OR (−2.74374), DID (−0.62490), NOT (−0.62490), HAVE (−0.24597), THE (0.80930), MENTAL (−1.16308), STATE (−0.01303), OR (−2.74374), CONDITION (−1.42540), CONSTITUTING (−0.82189), AN (−1.16308), ELEMENT (−0.82189), OF (−1.41313), THE (0.80930), CRIME (−0.82189), CHARGED (−0.82189), OR (−2.74374), OF (−1.41313), DEFENSE (−0.82189), THERETO (−0.82189), SUCH (−1.42540), ULTIMATE (−0.82189), ISSUES (−1.16308), ARE (−1.16308), MATTERS (−0.82189), FOR (0.90174), THE (0.80930), TRIER (−0.82189), OF (−1.41313), FACT (−0.24597), ALONE (−0.82189), PARTY_TOK (−0.88624), PARTY_TOK (−0.88624), PRESENT_TENSE_VERB_TOK (0.42974), PRESENT_TENSE_VERB_TOK (0.42974), PRESENT_TENSE_VERB_TOK (0.42974) |
| SO 4 | 0.8303 | 0.44 | 9 | 63 | 0 | Prior to final agency action, the UMWA may petition this court to grant additional appropriate relief in the event MSHA fails to adhere substantially to a schedule that would, as described in Part III (C), constitute a good faith effort by MSHA to come into compliance with the Mine Act. See Monroe, 840 F.2d at 947; TRAC, 750 F.2d at 80–81; see also Zegeer, 768 F.2d at 1488 ("If MSHA should fail to act with appropriate diligence in following the estimates it has tendered to this court, petitioners may invoke our authority to direct MSHA to complete the rulemaking process with due dispatch."). | PRIOR (1.21829), TO (0.84800), FINAL (1.21829), AGENCY (1.21829), ACTION (1.21829), THE (0.80930), UMWA (1.21829), MAY (−0.01303), PETITION (1.21829), THIS (1.41926), COURT (0.93346), TO (0.84800), GRANT (0.28048), ADDITIONAL (1.21829), APPROPRIATE (1.21829), RELIEF (−0.24597), IN (−1.25703), THE (0.80930), EVENT (1.21829), MSHA (1.72404), FAILS (1.21829), TO (0.84800), ADHERE (1.21829), SUBSTANTIALLY (1.21829), TO (0.84800), SCHEDULE (1.21829), THAT (0.07578), WOULD (1.21829), AS (1.28778), DESCRIBED (1.21829), IN (−1.25703), PART (0.28048), III (1.21829), CONSTITUTE (1.21829), GOOD (1.21829), FAITH (1.21829), EFFORT (1.72404), BY (1.32269), MSHA (1.72404), TO (0.84800), COME (1.21829), INTO (1.21829), COMPLIANCE (1.21829), WITH (−0.63475), THE (0.80930), MINE (1.21829), ACT (1.21829), SEE (0.93346), SEE (0.93346), ALSO (1.21829), QUOTED_STRING_LONG_TOK (−1.18415), PRONOUN_TOK (2.74522), CASE_CITE_TOK (−0.01849), CASE_CITE_TOK (−0.01849), CASE_CITE_TOK (−0.01849), FIRST_NAME_TOK (0.93346), PRESENT_TENSE_VERB_TOK (0.42974), PRESENT_TENSE_VERB_TOK (0.42974), PRESENT_TENSE_VERB_TOK (0.42974), FIRST_NAME_TOK (0.93346), PRESENT_TENSE_VERB_TOK (0.42974), PRESENT_TENSE_VERB_TOK (0.42974), PRESENT_TENSE_VERB_TOK (0.42974) |
| SO 5 | −0.5464 | 0.18 | 31 | 42 | 1 | A defendant is entitled to the opportunity to present competent, relevant evidence on the issues being tried. See United States v. Hamling, 418 U.S. 87, 125, 41 L. Ed. 2d 590, 94 S. Ct. 2887 (1974). The district court, however, "retains considerable latitude even with admittedly relevant evidence in rejecting that which is cumulative . . ." Id. at 127. | DEFENDANT (−0.62490), IS (−1.77476), ENTITLED (−1.16308), TO (0.84800), THE (0.80930), OPPORTUNITY (−0.82189), TO (0.84800), PRESENT (−0.82189), COMPETENT (−0.82189), RELEVANT (−1.42540), EVIDENCE (−2.01976), ON (−1.16308), THE (0.80930), ISSUES (−1.16308), BEING (−0.82189), TRIED (−0.82189), SEE (0.93346), THE (0.80930), DISTRICT (−0.82189), COURT (0.93346), HOWEVER (−0.82189), RETAINS (−0.82189), CONSIDERABLE (−0.82189), LATITUDE (−0.82189), EVEN (−0.24597), WITH (−0.63475), ADMITTEDLY (−0.82189), RELEVANT (−1.42540), EVIDENCE (−2.01976), IN (−1.25703), REJECTING (−0.82189), THAT (0.07578), WHICH (−0.82189), |

TABLE IX-continued

| | | | | | | |
|---|---|---|---|---|---|---|
| SO6 | 0.9365 | 0.23 | 8 | 51 | 0 | While the Taxing Authorities may be ready to acknowledge the precedence of federal bankruptcy law over state taxing provisions, they argue that the bankruptcy court in its confirmation order interpreted 11 U.S.C. Section 1146 (c), too expansively, applying it to circumstances not covered by the Bankruptcy Code's exempting provision. |
| SO8 | −0.5662 | 0.34 | 58 | 74 | 1 | Causation may be established by obtaining a "judgment, consent decree or a settlement that 'change (s) the legal relations of the parties such that defendants are leqally compelled to grant relief.'"Baumgartner v. Harrisburg Hous. Auth., 21 F.3d 541, 546 (3d Cir. 1994), (quoting Wheeler v. Towanda Area Sch. Dist., 950 F.2d 128, 132 (3d Cir. 1991)). Alternatively, plaintiff may establish causation through a "catalyst theory," where "even though the litigation did not result in a favorable judgment, the pressure of the lawsuit was a material contributing factor in bringing about extrajudicial relief." |
| S10 | −0.7466 | 0.115 | 18 | 24 | 1 | in essence, sufficiency is a test of adequacy. Whether the evidence is legally sufficient to sustain a verdict, is a question of law. |

SO6 tokens: IS (−1.77476), CUMULATIVE (−0.82189), QUOTED_STRING_LONG_TOK 1.18415), CASE_CITE_TOK (−0.01849), CASE_CITE_TOK (−0.01849), PARTY_TOK (−0.88624), PRESENT_TENSE_VERB_TOK (0.42974), PRESENT_TENSE_VERB_TOK (0.42974), PRESENT_TENSE_VERB_TOK (0.42974) WHILE (1.21829), THE (0.80930), TAXING (1.72404), AUTHORITIES (1.21829), MAY (−0.01303), BE (−0.24597), READY (1.21829), TO (0.84800), ACKNOWLEDGE (1.21829), THE (0.80930), PRECEDENCE (1.21829), OF (−1.41313), FEDERAL (0.28048), BANKRUPTCY (2.11289), LAW (−0.62490), OVER (1.21829), STATE (−0.01303), TAXING (1.72404), PROVISIONS (1.21829), THEY (1.72404), ARGUE (1.21829), THAT (0.07578), THE (0.80930), BANKRUPTCY (2.11289), COURT (0.93346), IN (−1.25703), ITS (1.72404), CONFIRMATION (1.21829), ORDER (0.28048), INTERPRETED (1.21829), TOO (1.21829), EXPANSIVELY (1.21829), APPLYING (1.21829), IT (0.39718), TO (0.84800), CIRCUMSTANCES (1.21829), NOT (−0.62490), COVERED (1.21829), BY (1.32269), THE (0.80930), BANKRUPTCY (2.11289), CODE (0.28048), EXEMPTING (1.21829), PROVISION (1.21829), PRONOUN_TOK (2.74522), PRONOUN_TOK (2.74522), CASE_CITE_TOK (−0.01849), PRONOUN_TOK (2.74522), PRESENT_TENSE_VERB_TOK (0.42974), PRESENT_TENSE_VERB_TOK (0.42974), PRESENT_TENSE_VERB_TOK (0.42974)

SO8 tokens: CAUSATION (−1.16308), MAY (−0.01303), BE (−0.24597), ESTABLISHED (−1.42540), BY (1.32269), OBTAINING (−0.82189), JUDGMENT (−1.64698), CONSENT (−0.82189), DECREE (−0.82189), OR (−2.74374), SETTLEMENT (−0.82189), THAT (0.07578), CHANGE (−0.82189), THE (0.80930), LEGAL (−0.82189), RELATIONS (−0.82189), OF (−1.41313), THE (0.80930), PARTIES (−0.82189), SUCH (−1.42540), THAT (0.07578), DEFENDANTS (−0.82189), ARE (−1.16308), LEGALLY (−1.16308), COMPELLED (−0.82189), TO (0.84800), GRANT (0.28048), RELIEF (−0.24597), QUOTING (−0.82189), ALTERNATIVELY (−0.82189), PLAINTIFF (−0.82189), MAY (−0.01303), ESTABLISH (−0.82189), CAUSATION (−1.16308), THROUGH (−0.82189), CATALYST (−0.82189), THEORY (−0.82189), WHERE (−1.16308), EVEN (−0.24597), THOUGH (−0.82189), THE (0.80930), LITIGATION (−0.82189), DID (−0.62490), NOT (−0.62490), RESULT (−0.82189), IN (−1.25703), FAVORABLE (−0.82189), JUDGMENT (−1.64698), THE (0.80930), PRESSURE (−0.82189), OF (−1.41313), THE (0.80930), LAWSUIT (−0.82189), WAS (0.90174), MATERIAL (−1.42540), CONTRIBUTING (−0.82189), FACTOR (−0.82189), IN (−1.25703), BRINGING (−0.82189), ABOUT (−0.82189), EXTRAJUDICIAL (−0.82189), RELIEF (−0.24597), QUOTED_STRING_LONG_TOK (−1.18415), QUOTED_STRING_LONG_TOK (−1.18415), QUOTED_STRING_LONG_TOK (−1.18415), CASE_CITE_TOK (−0.01849), CASE_CITE_TOK (−0.01849), PRESENT_TENSE_VERB_TOK (0.42974), PARTY_TOK (−0.88624), FIRST_NAME_TOK (0.93346), PARTY_TOK (−0.88624), PRESENT_TENSE_VERB_TOK (0.42974), PRESENT_TENSE_VERB_TOK (0.42974), PRESENT_TENSE_VERB_TOK (0.42974)

S10 tokens: IN (−1.25703), ESSENCE (−0.82189), SUFFICIENCY (−0.82189), IS (−1.77476), TEST (−0.82189), OF (−1.41313), ADEQUACY (−0.82189), WHETHER (−1.16308), THE (0.80930), EVIDENCE (−2.01976), IS (−1.77476), LEGALLY (−1.16308), SUFFICIENT (−0.82189), TO (0.84800), SUSTAIN (−0.82189), VERDICT (−1.16308), IS (−1.77476), QUESTION (−0.82189), OF (−1.41313), LAW (−0.62490),

TABLE IX-continued

| | | | | | | | |
|---|---|---|---|---|---|---|---|
| | | | | | | | PRESENT_TENSE_VERB_TOK (0.42974), PRESENT_TENSE_VERB_TOK (0.42974), PRESENT_TENSE_VERB_TOK (0.42974), PRESENT_TENSE_VERB TOK (0.42974) |
| S11 | 0.7978 | 0.085 | 2 | 16 | 0 | Moreover, even these after-the-fact statements reveal that McClaran believed that R/F was completely dismissed. | MOREOVER (1.21829), EVEN (−0.24597), THESE (1.21829), AFTER (1.21829), THE (0.80930), FACT (−0.24597), STATEMENTS (1.21829), REVEAL (1.21829), THAT (0.07578), MCCLARAN (1.21829), BELIEVED (1.21829), THAT (0.07578), WAS (0.90174), COMPLETELY (1.21829), DISMISSED (1.21829), PRESENT_TENSE_VERB_TOK (0.42974), |
| S12 | −0.5023 | 0.15 | 25 | 36 | 1 | It is irrelevant in this Matter that the deed to appellee's chain of title predated that to the appellants' chain of title. Appellants must have only "color of title." | IT (0.39718), IS (−1.77476), IRRELEVANT (−0.82189), IN (−1.25703), THIS (1.41926), MATTER (−0.24597), THAT (0.07578), THE (0.80930), DEED (−0.82189), TO (0.84800), APPELLEE (−0.82189), CHAIN (−1.16308), OF (−1.41313), TITLE (−1.42540), PREDATED (−0.82189), THAT (0.07578), TO (0.84800), THE (0.80930), APPELLANTS (−1.16308), CHAIN (−1.16308), OF (−1.41313), TITLE (−1.42540), APPELLANTS (−1.16308), MUST (−1.16308), HAVE (−0.24597), ONLY (−1.16308), COLOR (−0.82189), OF (−1.41313), TITLE (−1.42540), QUOTED_STRING_LONG_TOK (−1.18415), PRONOUN_TOK (2.74522), PRESENT_TENSE_VERB_TOK (0.42974), PARTY_TOK (−0.88624), PARTY_TOK (−0.88624), PARTY_TOK (−0.88624), PRESENT_TENSE_VERB_TOK (0.42974) |
| S13 | −0.6084 | 0.39 | 58 | 77 | 1 | n2 General Statutes Section 53a–60a provides in relevant part: "(a) A person is guilty of assault in the second degree with a firearm when he commits assault in the second degree as provided in section 53a–60, and in the commission of such offense he uses or is armed with and threatens the use of or displays or represents by his words or conduct that he possesses a pistol, revolver, machine gun, shotgun, rifle or other firearm. | N2 (−0.82189), GENERAL (−0.82189), STATUTES (−0.82189), 60A (−0.82189), PROVIDES (−1.16308), IN (−1.25703), RELEVANT (−1.42540), PART (0.28048), PERSON (0.28048), IS (−1.77476), GUILTY (−0.82189), OF (−1.41313), ASSAULT (−1.16308), IN (−1.25703), THE (0.80930), SECOND (−1.16308), DEGREE (−1.16308), WITH (−0.63475), FIREARM (−1.16308), WHEN (−1.16308), HE (−0.62490), COMMITS (−0.82189), ASSAULT (−1.16308), IN (−1.25703), THE (0.80930), SECOND (−1.16308), DEGREE (−1.16308), AS (1.28778), PROVIDED (−0.82189), IN (−1.25703), AND (0.56317), IN (−1.25703), THE (0.80930), COMMISSION (−0.82189), OF (−1.41313), SUCH (−1.42540), OFFENSE (−0.82189), HE (−0.62490), USES (−0.82189), OR (−2.74374), IS (−1.77476), ARMED (−0.82189), WITH (−0.63475), AND (0.56317), THREATENS (−0.82189), THE (0.80930), USE (−0.82189), OF (−1.41313), OR (−2.74374), DISPLAYS (−0.82189), OR (−2.74374), REPRESENTS (−0.82189), BY (1.32269), HIS (1.41926), WORDS (−0.82189), OR (−2.74374), CONDUCT (−0.82189), THAT (0.07578), HE (−0.62490), POSSESSES (−0.82189), PISTOL (−0.82189), REVOLVER (−0.82189), MACHINE (−0.82189), GUN (0.28048), SHOTGUN (−0.82189), RIFLE (−0.82189), OR (−2.74374), OTHER (−0.82189), FIREARM (−1.16308), STAT_CITE_TOK (−1.42540), PRONOUN_TOK (2.74522), STAT_CITE_TOK (−1.42540), PRONOUN_TOK (2.74522), PRONOUN_TOK (2.74522), PRONOUN_TOK (2.74522), PRESENT_TENSE_VERB_TOK (0.42974), PRESENT_TENSE_VERB_TOK (0.42974) |
| S14 | 0.8414 | 0.085 | 3 | 24 | 0 | That is the request you made, is that correct, Mr. Tittle? MR. TITTLE: It is, your Honor. | THAT (0.07578), IS (−1.77476), THE (0.80930), REQUEST (1.21829), YOU (1.21829), MADE (1.21829), IS (−1.77476), THAT (0.07578), CORRECT (1.21829), MR (1.72404), TITTLE (1.72404), MR (1.72404), TITTLE (1.72404), IT (0.39718), IS (−1.77476), YOUR (1.21829), HONOR (1.21829), PRONOUN_TOK (2.74522), PRONOUN_TOK (2.74522), PRONOUN_TOK (2.74522), PRESENT_TENSE_VERB_TOK (0.42974), PRESENT_TENSE_VERB_TOK (0.42974), PRESENT_TENSE_VERB_TOK (0.42974), PRESENT_TENSE_VERB_TOK (0.42974) |
| S18 | 0.7302 | 0.015 | 1 | 3 | 0 | Subject Matter Jurisdiction | SUBJECT (1.21829), MATTER (−0.24597), JURISDICTION (1.21829), |
| S19 | 0.8143 | 0.075 | 1 | 14 | 0 | At that time the pediatrician's office | AT (1.21829), THAT (0.07578), TIME (1.21829), THE (0.80930), PEDIATRICIAN |

TABLE IX-continued

| | | | | | | | |
|---|---|---|---|---|---|---|---|
| | | | | | | notified the Youngs and the Department of Health. | (1.21829), OFFICE (1.21829), NOTIFIED (1.21829), THE (0.80930), YOUNGS (1.21829), AND (0.56317), THE (0.80930), DEPARTMENT (1.21829), OF (−1.41313), HEALTH (1.21829) |
| S20 | −0.4951 | 0.17 | 26 | 39 | 1 | Norman v. Liberty Life Assurance Co., 556 S.W. 2d 772, 773 (Tenn.App. 1977); Truan v. Smith, 578 S.W. 2d 73, 74 (Tenn. 1979). Our duty upon review of conflicting evidence in a jury trial is not to determine where the truth lies, but only to determine if there was any material evidence to support the verdict below. | OUR (0.28048), DUTY (0.28048), UPON (−0.82189), REVIEW (−1.16308), OF (−1.41313), CONFLICTING (−0.82189), EVIDENCE (−2.01976), IN (−1.25703), JURY (−0.82189), TRIAL (−0.82189), IS (−1.77476), NOT (−0.62490), TO (0.84800), DETERMINE (−1.16308), WHERE (−1.16308), THE (0.80930), TRUTH (−0.82189), LIES (−0.82189), BUT (−0.82189), ONLY (−1.16308), TO (0.84800), DETERMINE (−1.16308), IF (−0.82189), THERE (−1.16308), WAS (0.90174), ANY (−0.82189), MATERIAL (−1.42540), EVIDENCE (−2.01976), TO (0.84800), SUPPORT (0.28048), THE (0 .80930), VERDICT (−1.16308), BELOW (−0.82189), CASE_CITE_TOK (−0.01849), CASE_CITE_TOK (−0.01849), PRESENT_TENSE_VERB_TOK (0.42974), PRESENT_TENSE_VERB_TOK (0.42974), PRESENT_TENSE_VERB_TOK (0.42974), PRESENT_TENSE_VERB_TOK (0.42974) |
| S21 | 1.0923 | 0.18 | 3 | 41 | 0 | Penwell neither performed his affirmative duty under the policy to file a claim with Western and Southern for his total disability nor did he pay the premiums as they fell due, as required by the policy | PENWELL (1.21829), NEITHER (1.21829), PERFORMED (1.21829), HIS (1.41926), AFFIRMATIVE (1.21829), DUTY (0.28048), UNDER (0.28048), THE (0.80930), POLICY (1.72404), TO (0.84800), FILE (0.28048), CLAIM (0.28048), WITH (−0.63475), WESTERN (1.21829), AND (0.56317), SOUTHERN (1.21829), FOR (0.90174), HIS (1.41926), TOTAL (1.21829), DISABILITY (1.21829), NOR (1.21829), DID (−0.62490), HE (−0.62490), PAY (1.21829), THE (0.80930), PREMIUMS (1.21829), AS (1.28778), THEY (1.72404), FELL (1.21829), DUE (1.21829), AS (1.28778), REQUIRED (1.21829), BY (1.32269), THE (0.80930), POLICY (1.72404), PRONOUN_TOK (2.74522), PRONOUN_TOK (2.74522), PRONOUN_TOK (2.74522), PRONOUN_TOK (2.74522), PRESENT_TENSE_VERB_TOK (0.42974), PRESENT_TENSE_VERB_TOK (0.42974) |
| S22 | 0.6273 | 0.11 | 4 | 22 | 0 | Kammes saw defendant holding a gun and standing in the center of the alley near a person who was lying face down. | KAMMES (1.21829), SAW (1.21829), DEFENDANT (−0.62490), HOLDING (1.21829), GUN (0.28048), AND (0.56317), STANDING 1.21829), IN (−1.25703), THE (0.80930), CENTER (1.21829), OF (−1.41313), THE (0.80930), ALLEY (1.21829), NEAR (1.21829), PERSON (0.28048), WHO (1.72404), WAS (0.90174), LYING (1.21829), FACE (1.21829), DOWN (1.21829), PARTY_TOK (−0.88624), PRESENT_TENSE_VERB_TOK (0.42974), |
| S23 | −0.7045 | 0.1 | 13 | 17 | 1 | n9 The administrative review appeals board is established under City of Waukesha, Wis., Municipal Code, Section 2.11 (3) (1995). | N9 (−0.82189), THE (0.80930), ADMINISTRATIVE (−0.82189), REVIEW (−1.16308), APPEALS (−0.82189), BOARD (−0.82189), IS (−1.77476), ESTABLISHED (−1.42540), UNDER (0.28048), CITY (−0.82189), OF (−1.41313), WAUKESHA (−0.82189), WIS (−0.82189), MUNICIPAL (−0.82189), CODE (0.28048), STAT_CITE_TOK (−1.42540), PRESENT_TENSE_VERB_TOK (0.42974) |
| S24 | 1.0477 | 0.03 | 1 | 9 | 0 | Appellant asked to get his wallet. | APPELLANT (1.21829), ASKED (1.21829), TO (0.84800), GET (1.21829), HIS (1.41926), WALLET (1.21829), PRONOUN TOK (2.74522), PARTY_TOK (−0.88624), PRESENT_TENSE_VERB_TOK (0.42974), |
| S26 | −0.503 | 0.12 | 17 | 24 | 1 | n3 It is well established in workers' compensation law that when a work-related injury aggravates a pre-existing condition a compensable claim arises. | N3 (−0.82189), IT (0.39718), IS (−1.77476), WELL (0.28048), ESTABLISHED (−1.42540), IN (−1.25703), WORKERS (−0.82189), COMPENSATION (−0.82189), LAW (−0.62490), THAT (0.07578), WHEN (−1.16308), WORK (−0.82189), RELATED (−0.82189), INJURY (−0.82189), AGGRAVATES (−0.82189), PRE (−0.82189), EXISTING (−0.82189), CONDITION (−1.42540), COMPENSABLE (−0.82189), CLAIM (0.28048), ARISES (−0.82189), PRONOUN_TOK (2.74522), PRESENT_TENSE_VERB_TOK (0.42974), PRESENT_TENSE_VERB_TOK (0.42974) |

TABLE IX-continued

| | | | | | | | |
|---|---|---|---|---|---|---|---|
| S3 0 | 0.9146 | 0.31 | 8 | 68 | 0 | The United States as well as the State of Alabama was founded by people who believe in God. I believe this effort to return voluntary prayer to our public schools for its return to us to the original position of the writers of the Constitution, this local philosophies and beliefs hundreds of Alabamians have urged my continuous support for permitting school prayer. | THE (0.80930), UNITED (1.21829), STATES (1.21829), AS (1.28778), WELL (0.28048), AS (1.28778), THE (0.80930), STATE (−0.01303), OF (−1.41313), ALABAMA (1.21829), WAS (0.90174), FOUNDED (1.21829), BY (1.32269), PEOPLE (1.21829), WHO (1.72404), BELIEVE (1.72404), IN (−1.25703), GOD (1.21829), BELIEVE (1.72404), THIS (1.41926), EFFORT (1.72404), TO (0.84800), RETURN (1.72404), VOLUNTARY (1.21829), PRAYER (1.72404), TO (0.84800), OUR (0.28048), PUBLIC (1 21829), SCHOOLS (1.21829), FOR (0.90174), ITS (1.72404), RETURN (1.72404), TO (0.84800), US (1.21829), TO (0.84800), THE (0.80930), ORIGINAL (1.21829), POSITION (1.21829), OF (−1.41313), THE (0.80930), WRITERS (1.21829), OF (−1.41313), THE (0.80930), CONSTITUTION (1.21829), THIS (1.41926), LOCAL (1.21829), PHILOSOPHIES (1.21829), AND (0.56317), BELIEFS (1.21829), HUNDREDS (1.21829), OF (−1.41313), ALABAMIANS (1.21829), HAVE (−0.24597), URGED (1.21829), MY (1.21829), COMTINUOUS (1.21829), SUPPORT (0.28048), FOR (0.90174), PERMITTING (1.21829), SCHOOL (1.21829), PRAYER (1.72404), PRONOUN_TOK (2.74522), PRONOUN_TOK (2.74522), PRESENT_TENSE_VERB_TOK (0.42974), PRESENT_TENSE_VERB_TOK (0.42974), PRESENT_TENSE_VERB_TOK (0.42974), PARTY_TOK (−0.88624), PRESENT TENSE VERB_TOK (0.42974), |

For example, the terms and tokens for sentence S02 are:
IN, SUMMARY, JUDGMENT, BE, GRANTED, PLEADINGS, DEPOSITIONS, ANSWERS, INTERROGATORIES, ADMISSIONS, ON, TOGETHER, WITH, AFFIDAVITS, MUST, SHOW, THERE, IS, NO, GENUINE, ISSUE, OF, MATERIAL, FACT, MOVING, PARTY, IS, ENTITLED, JUDGMENT, MATTER, OF, LAW, FED, CIV, PRO The classification of the sentence as ROL (class=1) or ~ROL (class=0) is provided in Table IX at the third column from the right.

Next, frequency counts are accumulated by class in step 501. Frequency counts that are accumulated include the total number of term or token occurrences in each class (denoted by Tx where x is either 0 (~ROL) or 1 (ROL); and each term or token's number of occurrences in each class, i.e. ROL or ~ROL. For the example regression set, the total number of terms and tokens in class ROL (i.e., class=1) is T1=461. For class ~ROL (i.e., class=0), the number is T0=311.

The first two columns of the table in Table V give each term or token's frequency count by class for the exemplary regression set of Table III. The first column of Table V gives a term's frequency count in class=0 and the second column gives the term's frequency count for class=1. For example, the word 'IS' occurred 3 times in sentences of class=0 and 13 times in sentences of class=1. Similarly, the token, PRONOUN_TOK occurred 14 times in sentences of class=0, and 6 times in sentences of class=1.

The Z value is then calculated for each term or token in step 502. The formula for calculating the Z value for a term or token, T, is:

$$Z=(P0-P1)/(TP*(1-TP)(1/T0+1/T1))^{0.5},$$

where Px is the probability of term/token T given class x (where x is either 0 or 1). This is equivalent to Fx/Tx, where Fx is the number of occurrences of the term in class x and Tx is the total number of terms and tokens in class x), and TP is the total probability of the term or token, which is (F0+F1)/(T0+T1).

Note that in the above formula, since P1 is subtracted from P0, a term/token with a negative Z value favors the ROL class, i.e., the probability of finding the term/token in the ROL class is greater than that of finding it in the ~ROL class. Likewise, there is a greater probability that a term/token with a positive Z value will be found in distribution class ~ROL.

The theory behind the present invention is that once Z values are calculated for a sample of randomly selected text units from distribution 0 and. 1 that is large enough so it is representative of most text units in these two distributions, an average Z value can be calculated for any text unit from either distribution. This average Z value can be used to determine from which distribution the text unit came. The average Z value for a text unit is the sum of Z values for all words in the text unit divided by the number of words in the text unit.

For each term or token of the example regression set, Table V gives, F0, F1, TP, P0, P1, and Z. For example, for the term 'IS', F0, F1, TP, P0, and P1 are respectively 3, 13, 0.02073, 0.00965, and 0.02820. Also, note that P0 can be calculated for any term/token of Table V using the formula: Px=Fx/Tx. For example, for the term 'IS', P0=3/311 or=0.00965. Furthermore, TP for any term/token of the table can be calculated using: TP=(F0+F1)/(T0+T1). For example, for 'IS', TP=(3+13)/(311+461), or=16/772 or =0.02073. So Z for the term 'IS' is $$(0.00965-0.02820)/(0.02073*(1-0.02073)(1/311+1/461))^{0.5}, \text{ or}$$
$$Z=-1.77476.$$

It should be noted that Z values calculated for two sets of documents can be used to select- terms (words) that are highly suggestive of the topic P set of documents.

Figure 6:
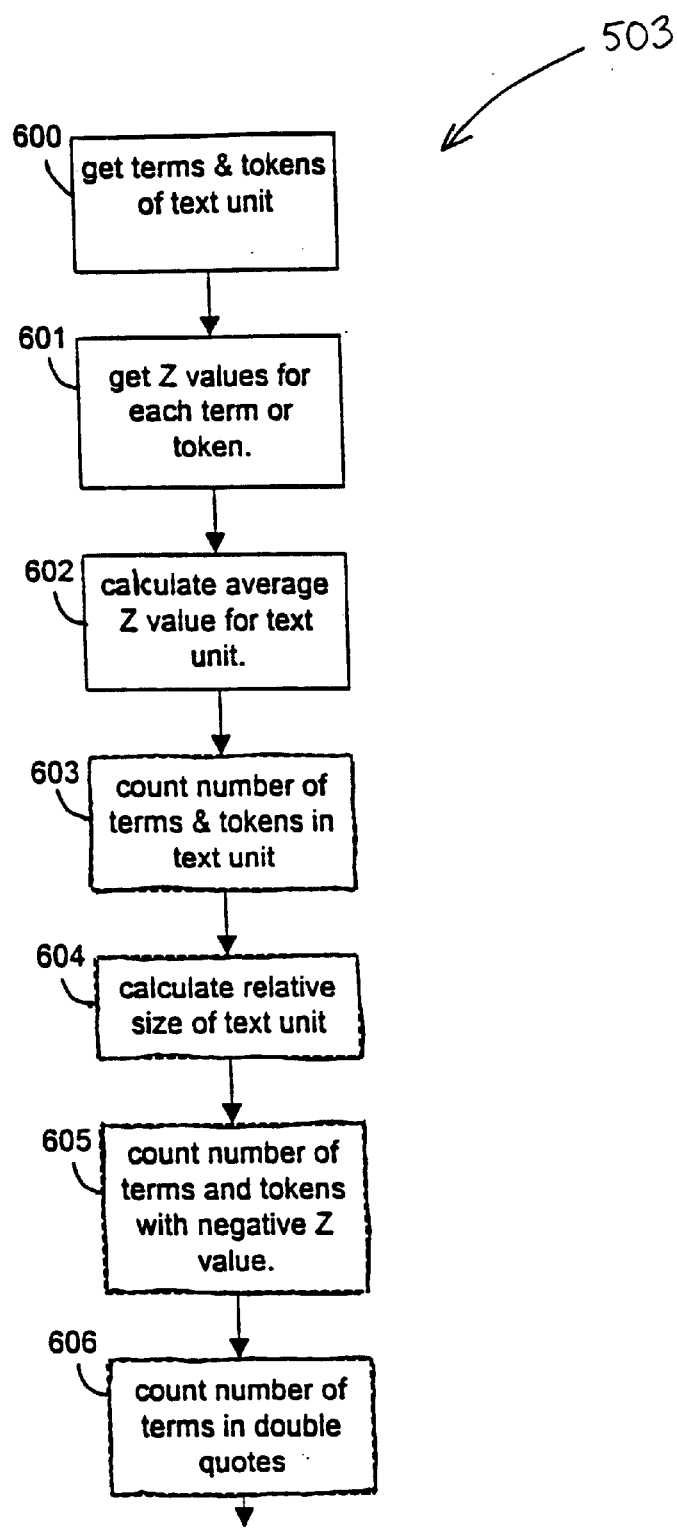
FIG. 6 is a flow diagram of the generate features for each text unit step of FIG. 4.

The next step 503 of the method is to generate features for each text unit. The sub-process described in Section VI and shown in FIG. 6 is used to perform this task. Table IX lists the features generated for each sentence of the exemplary regression set of Table III, where the second column is average Z for a sentence (avgz), the third column is relative size of the sentence (relsize), the fourth column is the number of terms/tokens having a negative Z value (nnegz) (i.e., favor the ROL class), and the fifth column is the number of terms/tokens in the sentence (nterms). The last column contains all the terms/tokens of each sentence with each term followed by its Z value in parentheses.

The next step 504 is to perform a logistic regression. The following is a SAS (Statistical Analysis System) program that performs logistic regression using the features generated in the previous step, step 503 for the regression set of Table III.

filename pdata 'regression.set.features';
   data preg;
   infile pdata;
   input pid avgz relsize nnegz nterms rol;
   proc sort data=preg;
      by rol;
   proc logistic order=data descending;
   model rol=avgz relsize nnegz nterms;
   run;

Table X shows the output file generated by the SAS. It contains the parameter estimates used as coefficients in the equation found in the trained knowledge base. The linear equation that comes from the SAS output of Table X is:

$$0.7549 - 14.0622 * f[1] - 14.2148 * f[2] - 0.0560 * f[3] + 0.1234 * f[4]$$

where f[1] through f[4] correspond respectively to the following variables in the SAS output: AVGZ, RELSIZE, NNEGZ, and NTERMS. And the coefficients multiplied to f[1] through f[4] in the above equation correspond to the Parameter Estimates just to the right of the above mentioned variables in the SAS output.

An example of the input file, regression.set.features' for the following SAS program would be the contents of columns 1 through 6 of Table IX, but without the column headers.

TABLE X

The LOGISTIC Procedure

Data Set: WORK. PREG
Response Variable: CC
Response Levels: 2
Number of Observations: 20
Link Function: Logit Response Profile

| Ordered Value | CC | Count |
|---|---|---|
| 1 | 1 | 10 |
| 2 | 0 | 10 |

Model Fitting Information and Testing Global Null Hypothesis BETA = 0

| Criterion | Intercept Only | Intercept and Covariates | Chi-Square for Covariates |
|---|---|---|---|
| AIC | 29.726 | 10.005 | — |
| SC | 30.722 | 14.984 | — |
| −2 LOG L | 27.726 | 0.005 | 27.721 with 4 DF (p = 0.0001) |
| Score | — | — | 19.582 with 4 DF (p = 0.0006) |

Analysis of Maximum Likelihood Estimates

| Variable | DF | Parameter Estimate | Standard Error | Wald Chi-Square | Pr > Chi-Square | Standardized Estimate | Odds Ratio |
|---|---|---|---|---|---|---|---|
| INTERCPT | 1 | 0.7549 | 49.6024 | 0.0002 | 0.9879 | — | — |
| AVGZ | 1 | −14.0622 | 76.1331 | 0.0341 | 0.8535 | −5.828626 | 0.000 |
| RELSIZE | 1 | −14.2148 | 864.0 | 0.0003 | 0.9869 | −0.972257 | 0.000 |
| NNEGZ | 1 | −0.0560 | 4.0734 | 0.0002 | 0.9890 | −0.607011 | 0.946 |
| SIZE | 1 | 0.1234 | 4.7012 | 0.0007 | 0.9791 | 1.580690 | 1.131 |

Association of Predicted Probabilities and Observed Responses

| Concordant = | 100.0% | Somers' D = | 1.000 |
|---|---|---|---|
| Discordant = | 0.0% | Gamma = | 1.000 |
| Tied = | 0.0% | Tau-a = | 0.526 |
| (100 pairs | | c = | 1.000 |

An optional step is the select linear equation step 505. The above SAS program uses all the given features, (avgz, relsize, nnegz, and nterms); therefore, there is only one set of parameter estimates in the SAS output file. But this SAS program can be modified to evaluate different combinations of the features. This is done using the STEPWISE option of the LOGISTIC proc (procedure) With this option, the analysis of maximum likelihood can be used to evaluate which combination of features works the best. The equation selected is the one with the smallest number of features, and having a large concordant value associated with it. There is a trade off, however. The greater the number of features in the equation, the higher the concordance value associated with the equation. But, as the number of features in the equation increases, the predictive power of the equation is reduced. Accordingly, it is best to select an equation that has few features but still has a concordance value associated with it that is close to the maximum concordance value.

The following is an example of a SAS program that uses the STEPWISE option to evaluate different combinations of the features.

filename pdata 'regression.set.features';
data preg;
infile pdata;
input pid avgz relsize nnegz nterms rol;
proc sort data=preg;
  by rol;
proc logistic order=data descending;
model rol=avgz relsize nnegz nterms
  /selection=stepwise
  details
  ctable;
run;

VI. Generate Features for Each Text Unit

FIG. 6 illustrates an expansion of the generate features for each text unit sub-process 503 of FIG. 5. Referring to FIG. 6, inputs to this sub-process are: 1) a list of terms and tokens with their associated Z values, illustratively shown in Table V; and 2) sentences, illustratively shown in Tables II, III and IV.

The output of this sub-process is a list of features for each sentence. Table IX contains features created for the set of sentences in Table III using the term/token Z values in Table V.

When using the Train & Calibrate ROL Recognizer sub-process 202 to create a trained knowledge base, the generate features for each text unit sub-process 503 creates the features that become input into the SAS logistic proc to create the equation that is ultimately part of the trained knowledge base. Also, when using the Find & Mark text units in case law documents sub-process 205 to determine which sentences of a case are ROL text units, the generate features for each text unit sub-process 503 creates the features used to calculate a score for each sentence.

The following describes how several features are calculated. These features are presented in the order of their ability to distinguish; one class from the other, namely their ability to distinguish ROL from ~ROL. The most capable features are presented first. Some or all of these features can be used. The optional select equation step 505 can be used to select the best of these features. Alternatively, the perform logistic regression step 504 can be employed to use all of these features.

Use of all of the features is recommended for the ROL or ~ROL embodiment of the present invention as applied to a very large corpus of documents, which can be on the order of five million. However, for binary classification tasks different than ROL/~ROL, having a corpus of documents significantly smaller to which the resulting classifier system will apply, then it may be feasible to proceed with fewer than all the features. Stepwise logistic regression decides which features are needed given that the pre-classified text units are representative of the whole corpus of text units.

Figure 7:
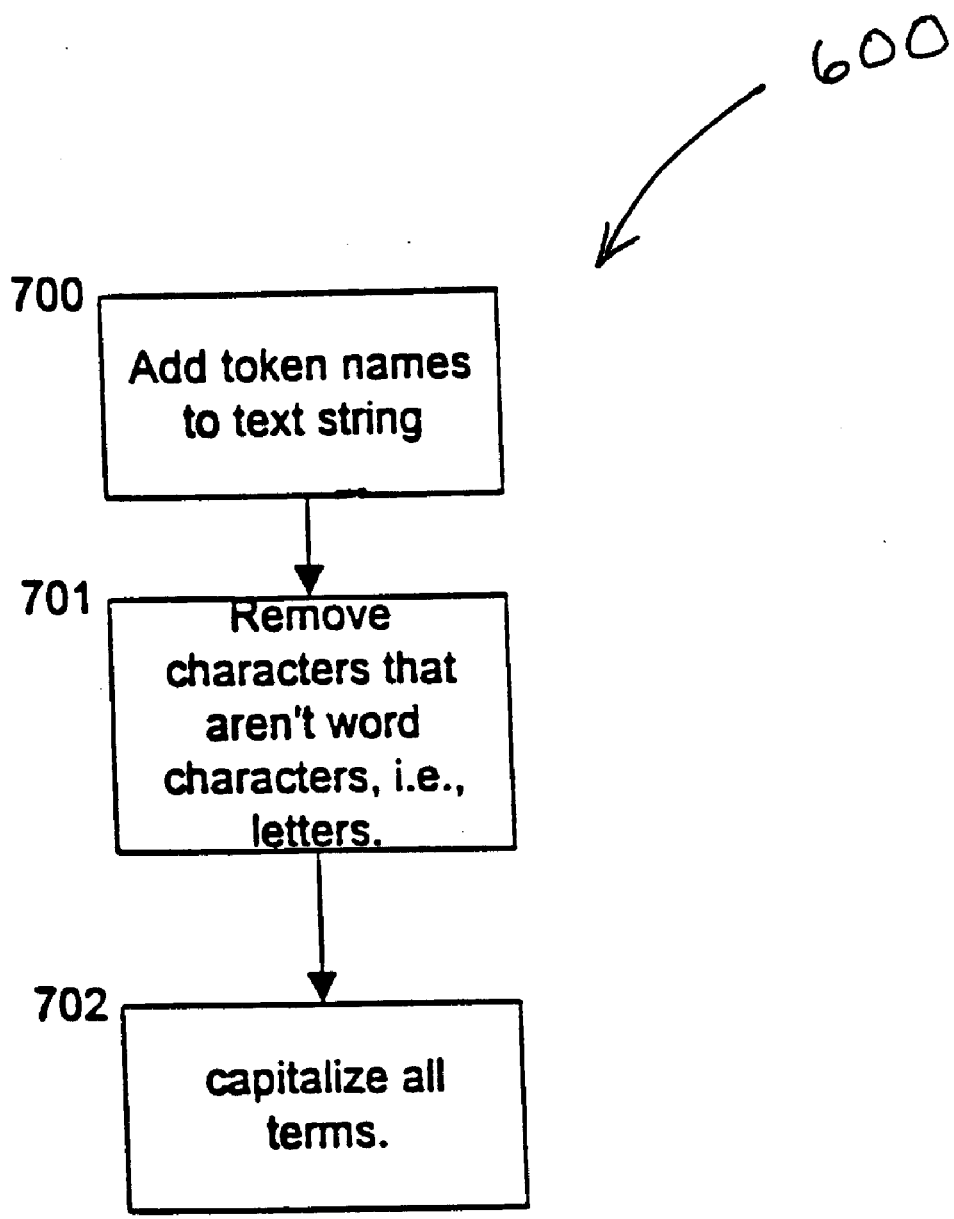
FIG. 7 is a flow diagram of the Get Terms & Tokens of text unit step of FIG. 6.

Calculation of the average Z value for a text unit begins with performance of the sub-process of FIG. 7. The sub-process of FIG. 7 is discussed more fully hereinafter under the heading, Get Terms & Tokens of Each Text Unit. In brief, the sub-process begins with getting all the terms and tokens in the sentence; then the Z value of each term/token is obtained from a table like the one in Table V. These Z values are summed and the result is divided by the number of terms/tokens in the sentence.

For example, the Z values of the three terms of sentence S18 of the regression set of. Table III, i.e., "Subject Matter Jurisdiction", are, respectively 1.21829, −0.24597, and 1.21829 (see. Tables IV and IX). So the average Z value is (1.21829−0.24597+1.21829)/3=0.7302.

Determination of the number of terms/tokens in a sentence begins with performance of the sub-process of FIG. 7. The sub-process of FIG. 7.is discussed more fully hereinafter under the heading, Get Terms & Tokens of Each Text Unit. In brief, the sub-process begins with getting all the terms and tokens in the sentence. Then these terms/tokens are counted.

For example, the number of terms/tokens in sentence S18, i.e., "Subject Matter Jurisdiction" is three; see Table IX for other examples.

Determination of the relative size of a sentence begins with performance of the sub-process of FIG. 7. The sub-process of FIG. 7 is discussed more fully hereinafter under the heading, Get Terms & Tokens of Each Text Unit. In brief, the sub-process begins with getting all the terms and tokens in the sentence. Next, these terms/tokens are counted. Finally, this count is divided by an estimate of the maximum number of terms/tokens in any sentence, found in the trained knowledge base.

For example, in Table IX, the relative size of sentence S18, i.e., "Subject Matter Jurisdiction" (see Table IX) is 3/200=0.015, where 200 is the estimate of the maximum number of terms/tokens in any sentence found in the trained knowledge base.

Determination of the number of terms/tokens in a sentence with negative Z values begins with performance of the sub-process of FIG. 7. The sub-process of FIG. 7 is discussed more fully hereinafter under the heading, Get Terms & Tokens of Each Text Unit. In brief, the sub-process begins with getting all the terms and tokens in the sentence. Then the Z value of each term/token is obtained from a table like Table V, and those terms/tokens with a negative Z value are counted.

For example, the Z values of the terms of sentence S18, i.e., "Subject Matter Jurisdiction", are, respectively 1.21829, −0.24597, and 1.21829 (see Tables IV and IX). So the number of terms/tokens with negative Z values is one (1).

Determination of the number of words in double quotes in a sentence begins by finding all text strings of the sentence that are inside double quotes ("). Then the words with more than one letter in these quoted strings are counted.

For example, sentence S12 (see Table III):

It is irrelevant in this matter that the deed to appellee's chain of title predated that to the appellants' chain of title. Appellants must have only "color of title." has one quoted, string, "color of title.", which contains three words with more than one letter.

Average Z values may be determined for only those sentences with an average Z value less than zero, i.e., favoring the ROL class. This approach is used when the text unit is larger than one sentence. First, the text unit is split into sentences. Second, the average Z value for each sentence of the text unit is calculated as described above. Third, the average Z values of sentences with a negative average Z value are summed and divided by the number of such sentences.

For example, assume that the text unit is a paragraph instead of a sentence, and the paragraph of interest is one from the sample case of Table I, specifically:

"A mortgage is merely security for a debt or other obligation and cannot exist independently of the debt or obligation (see, <CaseCite>Copp v Sands Point Marina, 17 NY2d 291, 292, 270 N.Y.S.2d 599, 217 N.E.2d 654</Casecite>). Here, the motion to dismiss the complaint was properly granted since the debt which the mortgage secured concededly was satisfied prior to the commencement of the action."

This paragraph contains these two sentences:

A03 A mortgage is merely security for a debt or other obligation and cannot exist independently of the debt or obligation (see, <CaseCite>Copp v Sands Point Marina, 17 NY2d 291, 292, 270 N.Y.S.2d 599, 217 N.E.2d 654<CaseCite>).

A04 Here, the motion to dismiss the complaint was properly granted since the debt which the mortgage secured concededly was satisfied prior to the commencement of the action.

The average Z values for these two sentences are respectively:. –0.3278 and 0.3765. Summing the average Z values of all sentences with a negative average Z value and dividing by the number of such sentences results in the value: –0.3278. It should be noted that in this example, there is only one sentence with a negative Z value, sentence A03.

Average Z values may also be determined for the sentence with the largest negative Z value, i.e., the sentence that most favors the ROL class. This approach is used when the text unit is larger than one sentence. First, each text unit is split into sentences. Second, the average Z value for each sentence of each text unit is calculated as described above. Third, the sentence with the average Z value that most favors the ROL class is found; in the preferred embodiment, this sentence would be the one with the most negative average Z value.

VII. Get Terms & Tokens of Each Text Unit

The purpose of a token is to label like phrases or words, for example case citations are given the label CASE_CITE_TOK. These labels tend to occur more often than any single instance of the token (e.g., any single instance of a case citation) in the pre-classified sentences used in the training session. Therefore, the Z values for the token labels will tend to highly correlate with either ROL (large negative Z values) or ~ROL (large positive Z values). This is one way to reduce the number of pre-classified sentences needed to arrive at training that is representative of a much larger corpus of sentences.

FIG. 7 sets forth the sub-process steps 700, 701 and 702 in the step 600 for getting terms and tokens for each text unit, shown in FIG. 6. Input to this sub-process is a sentence in the form of a text string. Output is a normalized list of terms and tokens found in the sentence.

This sub-process basically creates a list of normalized terms and tokens that represent the inputted sentence. This is accomplished by adding to the inputted text string specified token names if any of the text strings corresponding to the token names are found in the text. Token names may replace text or may be additional to the text.

In general, it is best to add tokens to a sentence instead of replacing text with them because the text of an individual instance of a token may have a Z value that correlates with the opposite token (e.g., ROL instead of ~ROL). But, in some cases, such as dates and cites, the parts that make up the text of a token do not correlate highly with either ROL or ~ROL and may correlate highly with the wrong token. In these cases, it is preferable to have the corresponding tokens replace text in the sentence.

Text strings associated with token names are of two types:
1) a list, and 2) a regular expression. Once the token names have been input, anything that is not a term or token is removed from the inputted text string.

Sentence S04, which follows, is used as an example input sentence:

Prior to final agency action, the UMWA may petition this court to grant additional appropriate relief in the event MSHA fails to adhere substantially to a schedule that would, as described in Part III(C), constitute a good faith effort by MSHA to come into compliance with the Mine Act. See <CASECITE>Monroe, 840 F.2d at 947</CASECITE>; <CASECITE>TRAC, 750 F.2d at 80–81</CASECITE>; see also <CASECITE>Zegeer, 768 F.2d at 1488<CASECITE>("If MSHA should fail to act with appropriate diligence in following the estimates it has tendered to this court, petitioners may invoke our authority to direct MSHA to complete the rulemaking process with due dispatch.").

The subprocess 600 of FIG. 7 comprises the steps 700, 701, and 702, respectively, of adding token names to the text string, removing characters that are not word characters, and then. capitalizing all terms.

When adding token names to the text string, the process that determines if a particular token name should be added to the input text string is executed only if the token's corresponding variable in the trained knowledge base is set to 1. For example, the process for determining if the case cite token, CASE_CITE_TOK, should be added is executed only if the variable:

case_citation=1.

Listed below are illustrative token names of the preferred embodiment, followed by an explanation of the process that determines if each name should be added:, (a)CASE_CITE_TOK, (b)STAT_CITE_TOK, (c)PRONOUN_TOK, (d)DATE_TOK, (e)FIRST_NAME_TOK, (f)DOLLAR_AMT_TOK, (g)PARTY_TOK, (h)PAST_TENSE_VERB_TOK, and (i)PRESENT_TENSE_VERB_TOK.

(a) The token name, CASE_CITE_TOK, replaces any case citation found in a sentence, where case citations are assumed to be enclosed in some markup, for example sgml tags like: <CASECITE> . . .</CASECITE>. Perl code that does the replacement is:

s/<CASECITE>.?<\/CASECITE>/CASE_CITE_TOK/g;

After the completion of (a), the example text string is:

Prior to final agency action, the UMWA may petition this court to grant additional appropriate relief in the event MSHA fails to adhere substantially to a schedule that would, as described in Part III(C), constitute a good faith effort by MSHA to come into compliance with the Mine Act. See CASE_CITE_TOK; CASE_CITE_TOK; see also CASE_CITE_TOK ("If MSHA should fail to act with appropriate diligence in following the estimates it has tendered to this court, petitioners may invoke our authority to direct MSHA to complete the rulemaking process with due dispatch.").

As shown, three case citations were, found in the text string.

(b) The token name, STAT_CITE_TOK, replaces any statute citation found in a sentence, where the statute citation is either enclosed in some sgml like markup, e.g. <STATCITE> . . . </STATCITE> or is one of the following followed by one or more spaces and one or more digits: $S, $Z, section, or chapter. Perl code that does the replacement is:

s/<STATCITE>.?<\/STATCITE>/STAT_CITE_TOK/g;
    s/(?:\$ [SZ] | [sS]ection| [cC]hapter)\s+\d+/STAT_CITE_TOK/g;

After the completion of (b), there is no change in the example text string because no statutes are found in the sentence.

(c) The token name, PRONBUN_TOK, is added to the text string when a pronoun, preferably identified from a list of pronouns stored in memory, is found in a sentence. After the completion of (c), the example text string is:

Prior to final agency action, the UMWA may petition this court to grant additional appropriate relief in the event MSHA fails to adhere substantially to a schedule that would, as described in Part III(C), constitute a good faith effort by MSHA to come into compliance with the Mine PRONOUN_TOK Act. See CASE_CITE_TOK; CASE_CITE_TOK; see also CASE_CITE_TOK ("If MSHA should fail to act with appropriate diligence in following the estimates it has tendered to this court, petitioners may invoke our authority to direct MSHA to complete the rulemaking process with due dispatch.").

In this instance, the term "Mine" in "Mine Act" is recognized as a pronoun.

(d) The token name, DATE_TOK, replaces any date found in a sentence, where a date is either a month or an abbreviation of a month followed by either a four digit year or a one or two digit day and a comma and then a two or four digit year. Also, if a month name is given in full without the day or year, this is accepted as a date. Perl code that does the replacement is:

s/\b$\{month\}\b\s*\d+\s*\d+/DATE_TOK/gi;
    s/\b$\{smonth\}\b\s*\d+\s*\d+/DATE_$_{TOK}$/gi;
where
    $month =
      "January|February|March|April|May|June|July|August|September|October|November|December", and
    $smonth =
      "Jan|Feb|Mar|Apr|May|Jun|Jul|Aug|Sept|Sep|Oct|Nov|Dec".

After the completion of (d), there is no change in the example text string because no dates are found in the sentence.

(e) The token name, FIRST_NAME_TOK, is added to the text of a sentence whenever a first name, preferably from a list of first names stored in memory, is found in a sentence. After the completion of (e), the example text string is:

Prior to final agency action, the UMWA may petition this court to grant FIRST_NAME_TOK additional appropriate relief in the event MSHA fails to adhere substantially to a schedule that would, as described in Part III(C), constitute a good faith FIRST_NAME_TOK effort by MSHA to come into compliance with the Mine PRONOUN_TOK Act. See CASE_CITE_TOK; CASE_CITE_TOK; see also CASE_CITE_TOK ("If MSHA should fail to act with appropriate diligence in following the estimates it has tendered to this court, petitioners may invoke our authority to direct MSHA to complete the rulemaking process with due dispatch.").

In this instance, 'grant' and 'faith' are recognized as first names.

(f) The token name, DOLLAR_AMT_TOK, replaces any dollar amounts found in a sentence, where a dollar amount is "$" followed by one space and any combination of digits, periods, and comma. Perl code that does the replacement is:

s/\$\s[0–9,.]+/DOLLAR_AMT_TOK/g;

After the completion of (f), there is no change in the example text string because no dollar amounts are found in the sentence.

(g) The token name, PARTY_TOK, is added to the text of a sentence whenever a party name word, preferably from a list of party name words stored in memory, is found in a sentence. After the completion of (g), there is no change is the example text string because no party names are found in the sentence.

(h) The token name, PAST_TENSE_VERB_TOK, is added to the text of a sentence whenever a past tense verb, preferably from a list of past tense verbs stored in memory, is found in a sentence. After the completion of (h), there is no change in the example text string because no past tense verbs are found in the sentence.

(i) The token name, PRESENT_TENSE_VERB_TOK, is added to the text of a sentence whenever a present tense verb, preferably from a list of present tense verbs stored in memory, is found in a sentence. After the completion of (i), the example text string is:

Prior to final agency action, the UMWA may petition this court to grant FIRST_NAME_TOK additional appropriate relief in the event MSHA fails to adhere PRESENT_TENSE_VERB_TOK substantially to a schedule that would PRESENT_TENSE_VERB_TOK, as described in Part III(C), constitute PRESENT_TENSE_VERB_TOK a good faith FIRST_NAME_TOK effort by MSHA to come PRESENT_TENSE_VERB_TOK into compliance with the Mine PRONOUN_TOK Act. See PRESENT_TENSE_VERB_TOK CASE_CITE_TOK; CASE_CITE_TOK; see PRESENT_TENSE_VERB TOK also CASE_CITE_TOK ("If MSHA should fail to act with appropriate diligence in following the estimates it has tendered to this court, petitioners may invoke our authority to direct MSHA to complete the rulemaking process with due dispatch.").

In this instance, 'adhere', 'would', 'constitute' and 'see' are recognized as present tense verbs.

Having added token names to the text string, the next step .701 is to remove any string of characters that is not made of one of these characters: letter, digit, '_', space'. Any single letter terms are also removed. This leaves only terms and tokens separated by spaces in the text of a text unit. Pern code that does the replacement is:

s/[,.;:'"?\$#@*\|\/\\[\]()\{\}\!\%\+\=<>\-]+//g; s/\b[a-zA-Z]\b//g;

Upon removal of non-word characters, the example text string is:

Prior to final agency action the UMWA may petition this court to grant FIRST_NAME_TOK additional appropriate relief in the event MSHA fails to adhere PRESENT_TENSE_VERB_TOK substantially to schedule that would PRESENT_TENSE_VERB_TOK as described in Part III constitute PRESENT_TENSE_VERB_TOK good faith FIRST_NAME_TOK effort by MSHA to come PRESENT_TENSE_VERB_TOK into compliance with the Mine PRONOUN_TOK Act See PRESENT_$_{TENSE}$ VERB_TOK_CASE_CITE_$_{TOK}$ CASE_CITE_TOK see PRESENT_TENSE_VERB_TOK also CASE_CITE_TOK If MSHA should fail to act with appropriate diligence in following the estimates it has tendered to this court petitioners may invoke our authority to direct MSHA to complete the rulemaking process with due dispatch.

The final step is to normalize or capitalize all terms 702. After the completion of this step, the example text string is:

PRIOR TO FINAL AGENCY ACTION THE UMWA MAY PETITION THIS COURT TO GRANT FIRST_NAME_TOK ADDITIONAL APPROPRIATE RELIEF IN THE EVENT MSHA FAILS TO ADHERE PRESENT_TENSE_VERB_TOK SUBSTANTIALLY TO SCHEDULE THAT WOULD PRESENT_TENSE_VERB_TOK AS DESCRIBED IN PART III CONSTITUTE PRESENT_TENSE_VERB_TOK GOOD FAITH FIRST_NAME_TOK EFFORT BY MSHA TO COME PRESENT_TENSE_VERB_TOK INTO COMPLIANCE WITH THE MINE PRONOUN_TOK ACT SEE PRESENT_TENSE_VERB_TOK CASE_CITE_TOK CASE_CITE_TOK SEE PRESENT_TENSE_VERB_TOK ALSO CASE_CITE_TOK IF MSHA SHOULD FAIL TO ACT WITH APPROPRIATE DILIGENCE IN FOLLOWING THE ESTIMATES IT HAS TENDERED TO THIS COURT PETITIONERS MAY INVOKE OUR AUTHORITY TO DIRECT MSHA TO COMPLETE THE RULEMAKING PROCESS WITH DUE DISPATCH.

Upon completion of getting, terms and tokens for each text unit, the process returns to the appropriate step, depending upon context. For example, when creating the linear regression equation using the sub-process 302 as shown in FIG. 5, the process continues with the step 501 of accumulating frequency counts by class. Similarly, when using the sub-process 503 of generating features for each text unit as shown in FIG. 6, the process continues with the step 601 of getting Z values for each term or token.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Broadly, the present invention may be used for any binary classification task and is intended to encompass any use of the method disclosed to classify text units as belonging to either one category of text or the other in accordance with binary classification. For example, the present invention may be used to classify text units as either "fact" or "discussion". Therefore, it is not desired to limit the invention to the specific examples disclosed or the exact application and operation shown and described. Rather, all suitable modifications and equivalents may be resorted to, falling within the scope of the invention.

What is claimed is:

1. A method for finding a specified type of text unit in text using a computer, comprising the steps of:

inputting to the computer a training set of labeled text units;

inputting to the computer an initialized knowledge base;

processing the training set of labeled text units to generate a trained knowledge base using the computer;

inputting to the computer a document containing text units, said text units including the specified type of text unit and other text units, said other text units being text units not of the specified type of text unit;

using the computer, finding and marking text units of the specified type of text unit in the document using the trained knowledge base; and outputting the document with the text units of the specified type of text unit marked.

2. The method as set forth in claim 1, the step of processing comprising the steps of:

inputting to the computer a training set of text units, each text unit in the training set being classified as one of the specified type of text unit and other text units;

partitioning the inputted training set into two subsets to randomly select a regression subset and a calibration subset;

creating, using the regression subset, at least one linear equation for calculating a score for each text unit; and selecting, using the linear equation and the calibration subset, a threshold for the score.

3. The method as set forth in claim 2, the step of creating comprising the steps of:

generating a Z value for each term and each token in the text units of the regression subset; and developing, using logistic regression, the linear equation as a logistic regression equation.

4. The method as set forth in claim 3, wherein in the selecting step the threshold is selected using the generated Z values, the equation, and the calibration subset.

5. The method as set forth in claim 2, the step of finding and marking text units of the specified type of text unit comprising the steps of:

finding and extracting a portion of the inputted document using the computer;

partitioning the extracted portion into text units;

generating features for each text unit;

applying the linear equation and a sigmoid function to each text unit to generate, for each text unit, a score;

comparing the score to a threshold, selecting as text units of the specified type of text unit those text units having a score greater than the threshold, and marking the selected text units of the specified type of text unit; and outputting the case law document with the selected text units of the specified type of text unit marked.

6. The method as set forth in claim 2, the step of creating comprising the steps of:

getting terms or tokens for each text unit of the regression subset;

accumulating frequency counts of text units of the specified type of text unit and other text units;

calculating a Z value for each term or token;

generating features for each text unit; and performing, using the generated features, logistic regression to generate the linear equation.

7. The method as set forth in claim 6, further comprising the steps of:

creating a plurality of equations; and selecting an equation from the plurality of equations.

8. The method as set forth in claim 6, the step of generating features for each text unit further comprising at least one of the steps of:

determining a Z value for each term or token;

calculating an average Z value for the text unit using the Z values for all of the terms or tokens;

counting the terms and tokens in the text unit;

calculating a relative size of the text unit based on the number of terms and tokens counted;

counting a number of terms and tokens having negative Z values; and counting a number of terms appearing in double quotes.

9. The method as set forth in claim 6, the step of getting terms and tokens for each text unit comprising the steps of:

inserting into the text by the computer, in response to a specified text string, a corresponding token name associated with the specified text string;

removing, from the text by the computer, characters other than characters belonging to a specified set; and capitalizing all terms remaining in the text.

10. The method as set forth in claim 9, wherein the step of inserting includes replacing the specified text string with the corresponding token name.

11. The method as set forth in claim 9, wherein the step of inserting includes adding the corresponding token name to the specified text string.

12. The method as set forth in claim 1, wherein the specified type of text unit is rule of law (ROL) and the other text units are not rule of law (~ROL).

13. A computer-based method for generating a trained knowledge base to distinguish a specified type of text unit from text units not of the specified type of text unit, comprising the steps of:

inputting to a computer a training set of text units, each text unit in the training set being classified as one of the specified type of text unit or other text units, said other text units being text units not of the specified type of text unit;

partitioning the inputted training set to randomly select a regression subset and a calibration subset using the computer;

getting terms and tokens for each text unit in the regression subset using the computer;

accumulating frequency counts of text units of the specified type of text unit and other text units;

generating a Z value for each term and each token in the text units of the regression subset using the computer;

generating features for each text unit of the regression subset using the computer; and creating, using the generated features, a linear equation for calculating a score for each text unit using the computer; and selecting, using the linear equation and the calibration subset, a threshold for the score using the computer.

14. The method as set forth in claim 13, the step of generating features for each text unit comprising:

determining a Z value for each term or token; and calculating an average Z value for the text unit using the Z values for all of the terms and tokens.

15. The method as set forth in claim 14, the step of generating features for each text unit comprising at least one of the steps of:

determining the terms and tokens in the text unit;

calculating a relative size of the text unit;

counting a number of terms and tokens having negative average Z values; and counting a number of terms appearing in double quotes.

16. The method as set forth in claim 13, wherein the specified type of text unit is rule of law.

17. A computer-based method for classifying text from input documents using a trained knowledge base to distinguish text units of a specified type of text unit from text units not of the specified type of text unit, comprising the steps of:

inputting a text-based document using a computer;

extracting a portion of the input text-based document using the computer;

partitioning the extracted portion into text units using the computer;

generating features for each text unit using the computer;

applying a linear equation and a sigmoid function to each text unit to generate, using the computer, a score for each text unit;

comparing the score to a threshold, and selecting as text units of the specified type those text units having a score greater than the threshold using the computer; and marking the selected text units using the computer and outputting the text-based document with the selected text units marked.

18. The method as set forth in claim 17, wherein the specified type of text unit is rule of law.

19. A system for classifying text from input documents using a trained knowledge base to distinguish text units of a specified type of text unit from text units not of the specified type of text unit, comprising:

means for inputting a text-based document to a computer;

means for extracting a portion of the input text-based document and for partitioning the extracted portion into text units;

means for generating features for each text unit;

means for applying a linear equation and a sigmoid function to each text unit to generate a score for each text unit;

means for comparing the score to a threshold, and for selecting as text units of the specified type those text units having a score greater than the threshold;

means for marking the selected text units; and means for outputting the text-based document with the selected text units marked.

* * * * *